United States Patent
Tsai et al.

(10) Patent No.: US 8,649,112 B2
(45) Date of Patent: Feb. 11, 2014

(54) IMAGE LENS ASSEMBLY

(75) Inventors: Tsung-Han Tsai, Taichung (TW);
Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/602,334

(22) Filed: Sep. 4, 2012

(65) Prior Publication Data

US 2013/0176631 A1 Jul. 11, 2013

(30) Foreign Application Priority Data

Jan. 5, 2012 (TW) .............................. 101100474 A

(51) Int. Cl.
G02B 13/18 (2006.01)
G02B 9/60 (2006.01)

(52) U.S. Cl.
USPC ............ 359/714; 359/740; 359/763; 359/766

(58) Field of Classification Search
USPC ........................ 359/714, 740, 763, 764–766
See application file for complete search history.

(56) References Cited

U.S. PATENT DOCUMENTS

| 7,869,142 | B2 | 1/2011 | Chen et al. | |
|---|---|---|---|---|
| 8,000,030 | B2 | 8/2011 | Tang | |
| 8,000,031 | B1 | 8/2011 | Tsai | |
| 2011/0249348 | A1* | 10/2011 | Kubota et al. | 359/764 |
| 2011/0310287 | A1* | 12/2011 | Ohtsu | 359/764 |
| 2012/0188655 | A1* | 7/2012 | Tsai et al. | 359/714 |
| 2012/0250167 | A1* | 10/2012 | Hashimoto | 359/763 |
| 2013/0010374 | A1* | 1/2013 | Hsieh et al. | 359/714 |

* cited by examiner

Primary Examiner — Evelyn A. Lester
(74) Attorney, Agent, or Firm — CKC & Partners Co., Ltd.

(57) ABSTRACT

An image lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element with refractive power is made of plastic material, and has at least one surface being aspheric. The fourth lens element with refractive power is made of plastic material, and has a concave object-side surface and a convex image-side surface, wherein at least one surface of the fourth lens element is aspheric. The fifth lens element with positive refractive power is made of plastic material, and has a convex object-side surface and a convex image-side surface, wherein at least one surface of the fifth lens element is aspheric.

24 Claims, 14 Drawing Sheets

IMAGE LENS ASSEMBLY

RELATED APPLICATIONS

The application claims priority to Taiwan Application Serial Number 101100474, filed Jan. 5, 2012, which is herein incorporated by reference.

BACKGROUND

1. Technical Field

The present invention relates to an image lens assembly. More particularly, the present invention relates to a compact image lens assembly applicable to electronic products.

2. Description of Related Art

In recent years, with the popularity of mobile products with camera functionalities, the demand for miniaturizing an image lens assembly is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact image lens assemblies have gradually evolved toward the field of higher megapixels, there is an increasing demand for compact image lens assemblies featuring better image quality.

A conventional compact image lens assembly employed in a portable electronic product mainly adopts a four lens elements structure. Due to the popularity of mobile products with high specification, such as smart phones and PDAs (Personal Digital Assistants), the pixel and image quality requirements of the compact image lens assembly have increased rapidly. However, the conventional four lens elements structure cannot satisfy the requirements of the compact image lens assembly.

Another conventional compact image lens assembly provides a five lens elements structure. The image lens assembly with five lens elements can increase the image quality and resolving power thereof. However, the lens element with refractive power which closest to the image side of the image lens assembly is concave which cannot reduce the angle of the incident light on the peripheral region of the fifth lens element, and the photosensitivity would be restricted which lead to image noise.

SUMMARY

According to one aspect of the present disclosure, an image lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element with refractive power is made of plastic material, and has at least one of an object-side surface and an image-side surface being aspheric. The fourth lens element with refractive power is made of plastic material, and has a concave object-side surface and a convex image-side surface, wherein at least one of the object-side surface and the image-side surface of the fourth lens element is aspheric. The fifth lens element with positive refractive power is made of plastic material, and has a convex object-side surface and a convex image-side surface, wherein at least one of the object-side surface and the image-side surface of the fifth lens element is aspheric. When a focal length of the image lens assembly is f, a focal length of the second lens element is f2, an axial distance between the object-side surface of the first lens element and an image plane is TTL, and a maximum image height of the image lens assembly is ImgH, the following relationships are satisfied:

$-1.4 < f/f2 < 0$; and $TTL/ImgH < 2.2$.

According to another aspect of the present disclosure, an image lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element with refractive power has at least one of an object-side surface and an image-side surface being aspheric. The fourth lens element with refractive power is made of plastic material, and has a concave object-side surface, wherein at least one of the object-side surface and an image-side surface of the fourth lens element is aspheric. The fifth lens element with positive refractive power is made of plastic material, and has a convex object-side surface and a convex image-side surface, wherein at least one of the object-side surface and the image-side surface is aspheric. The first through fifth lens elements are five independent and non-cemented lens elements. The image lens assembly further includes a stop. When a focal length of the image lens assembly is f, a focal length of the second lens element is f2, an axial distance between the stop and the image-side surface of the fifth lens element is SD, an axial distance between the object-side surface of the first lens element and the image-side surface of the fifth lens element is TD, an axial distance between the object-side surface of the first lens element and an image plane is TTL, a maximum image height of the image lens assembly is ImgH, a curvature radius of the image-side surface of the third lens element is R6, and a curvature radius of the object-side surface of the fourth lens element is R7, the following relationships are satisfied:

$-1.4 < f/f2 < 0$;

$0.7 < SD/TD < 1.1$;

$TTL/ImgH < 2.2$; and $|R7/R6| < 0.9$.

According to yet another aspect of the present disclosure, an image lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element with refractive power has at least one of an object-side surface and an image-side surface being aspheric. The fourth lens element with refractive power is made of plastic material and has a concave object-side surface, wherein at least one of the object-side surface and an image-side surface of the fourth lens element is aspheric. The fifth lens element with positive refractive power is made of plastic material, and has a convex object-side surface and a convex image-side surface, wherein at least one of the object-side surface and the image-side surface of the fifth lens element is aspheric, and the fifth lens element has at least one inflection point formed on at least one of the object-side surface and the image-side surface thereof. When an axial distance between the object-side surface of the first lens element and an image plane is TTL, a maximum image height of the image lens assembly is ImgH, a curvature radius of the image-side surface of the third lens element is R6, and a curvature radius of the object-side surface of the fourth lens element is R7, the following relationships are satisfied:

$TTL/\mathrm{ImgH}<2.2$; and $|R7/R6|<0.9$.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
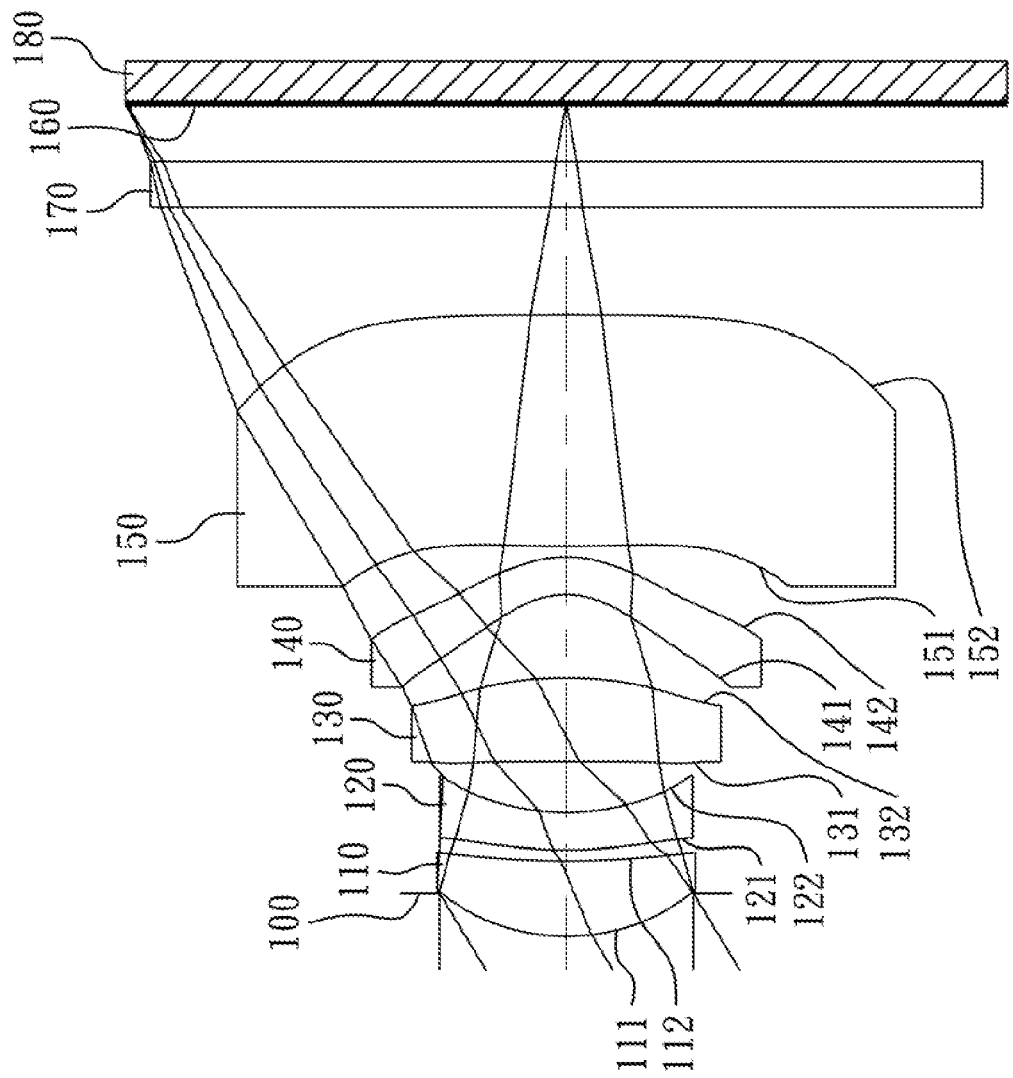
FIG. 1 is a schematic view of an image lens assembly according to the 1st embodiment of the present disclosure.

An image lens assembly includes, in order from an object side to an image side, a first lens element, a second lens element, a third lens element, a fourth lens element and a fifth lens element. The image lens assembly further includes an image sensor located on an image plane.

The first lens element, the second lens element, the third lens element, the fourth lens element and the fifth lens element are five independent and non-cemented lens elements. That is, any two lens elements adjacent to each other are not cemented (such as the image-side surface of the first lens element and the object-side surface of the second lens element), and there is an air space between the two lens elements. The manufacture of the cemented lenses is more complex than the manufacture of the non-cemented lenses. Especially, the cemented surfaces of the two lens elements should have accurate curvatures for ensuring the connection between the two lens elements, and the displacement between the cemented surfaces of the two lens elements during cementing the lens elements may affect the optical quality of the image lens assembly. Therefore, the image lens assembly of the present disclosure provides five independent and non-cemented lens elements for improving upon the problem generated by the cemented lens elements.

The first lens element with positive refractive power has a convex object-side surface, so that the total track length of the image lens assembly can be reduced by adjusting the positive refractive power of the first lens element.

The second lens element with negative refractive power can correct the aberration generated from the first lens element with positive refractive power.

The fourth lens element has a concave object-side surface and a convex image-side surface, so that the astigmatism of image lens assembly can be corrected.

The fifth lens element with positive refractive power further reduces the total track length of the image lens assembly. The fifth lens element has a convex object-side surface and a convex image-side surface, and the fifth lens element has at least one inflection point formed on at least one of the object-side surface and the image-side surface thereof. Therefore, the incident angle of the off-axis field on the image sensor can be effectively minimized and the sensitivity of the image sensor can be enhanced for reducing the image noise.

When a focal length of the image lens assembly is f, and a focal length of the second lens element is f2, the following relationship is satisfied:

$-1.4<f/f2<0$.

Therefore, the negative refractive power of the second lens element can be adjusted for correcting the aberration generated from the first lens element.

When an axial distance between the object-side surface of the first lens element and an image plane is TTL, and a maximum image height of the image lens assembly is ImgH, the following relationship is satisfied:

$TTL/\mathrm{ImgH}<2.2$.

Therefore, the total track length of the image lens assembly can be reduced so as to maintain the compact size of the image lens assembly for portable electronic products.

Furthermore, TTL and ImgH can satisfy the following relationship:

$TTL/\mathrm{ImgH}<2.0$.

When an axial distance between the image-side surface of the fifth lens element and the image plane is BFL, and the axial distance between the object-side surface of the first lens element and the image plane is TTL, the following relationship is satisfied:

$0<BFL/TTL<0.4$.

Therefore, the back focal length of the image lens assembly can be adjusted for reducing the total track length of the image lens assembly so as to maintain the compact size of the image lens assembly.

The image lens assembly further includes a stop located between the stop and the second lens element. When an axial distance between the stop and the image-side surface of the fifth lens element is SD, and an axial distance between the object-side surface of the first lens element and the image-side surface of the fifth lens element is TD, the following relationship is satisfied:

$$0.70<SD/TD<1.1.$$

Therefore, the image lens assembly can have a good balance between the telecentric and wide-angle characteristics, as well as a desirable total track length of the image lens assembly.

When a curvature radius of an image-side surface of the first lens element is R2, and a curvature radius of the object-side surface of the second lens element is R3, the following relationship is satisfied:

$$|R3/R2|<0.9.$$

Therefore, the curvatures of the first lens element and the second lens element can correct the astigmatism of the image lens assembly.

When an Abbe number of the first lens element is V1, and an Abbe number of the second lens element is V2, the following relationship is satisfied:

$$27<V1-V2<40.$$

Therefore, the chromatic aberration of the image lens assembly can be corrected.

When a central thickness of the fourth lens element is CT4, and a central thickness of the fifth lens element is CT5, the following relationship is satisfied:

$$0.05<CT4/CT5<0.6.$$

Therefore, the manufacture of the lens elements and the fabrication of the image lens assembly would be easier.

When a refractive index of the second lens element is N2, the following relationship is satisfied:

$$1.55<N2<1.7.$$

Therefore, the proper refractive index of the second lens element can reduce the aberration of the image lens assembly.

When a curvature radius of the image-side surface of the third lens element is R6, and a curvature radius of the object-side surface of the fourth lens element is R7, the following relationship is satisfied:

$$|R7/R6|<0.9.$$

Therefore, the aberration of the image lens assembly can be corrected by adjusting the curvatures of the image-side surface of the third lens element and the object-side surface of the fourth lens element.

Furthermore, R7 and R6 can satisfy the following relationship:

$$|R7/R6|<0.6.$$

When the focal length of the image lens assembly is f, and a focal length of the fifth lens element is f5, the following relationship is satisfied:

$$0<f/f5<1.4.$$

Therefore, the high order aberration of the image lens assembly can be corrected by adjusting the positive refractive power of the fifth lens element.

According to the image lens assembly of the present disclosure, the lens elements thereof can be made of glass or plastic material. When the lens elements are made of glass material, the distribution of the refractive power of the image lens assembly may be more flexible for design. When the lens elements are made of plastic material, the cost of manufacture can be effectively reduced. Furthermore, the surface of each lens element can be aspheric, so that it is easier to make the surface into non-spherical shapes. Consequently, more controllable variables are obtained, and the aberration as well as the number of required lens elements can be reduced while constructing an optical system. Therefore, the total track length of the image lens assembly can also be reduced.

According to the image lens assembly of the present disclosure, when a lens element has a convex surface, it indicates that there is a convex surface at the paraxial region; and when a lens element has a concave surface, indicates that there is a concave surface at the paraxial region.

According to the image lens assembly of the present disclosure, the image lens assembly can include at least one stop, such as an aperture stop, glare stop, field stop, etc. Said glare stop or said field stop is allocated for reducing stray light while retaining high image quality. Furthermore, when a stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-7th specific embodiments are provided for further explanation.

1st Embodiment

Figure 2:
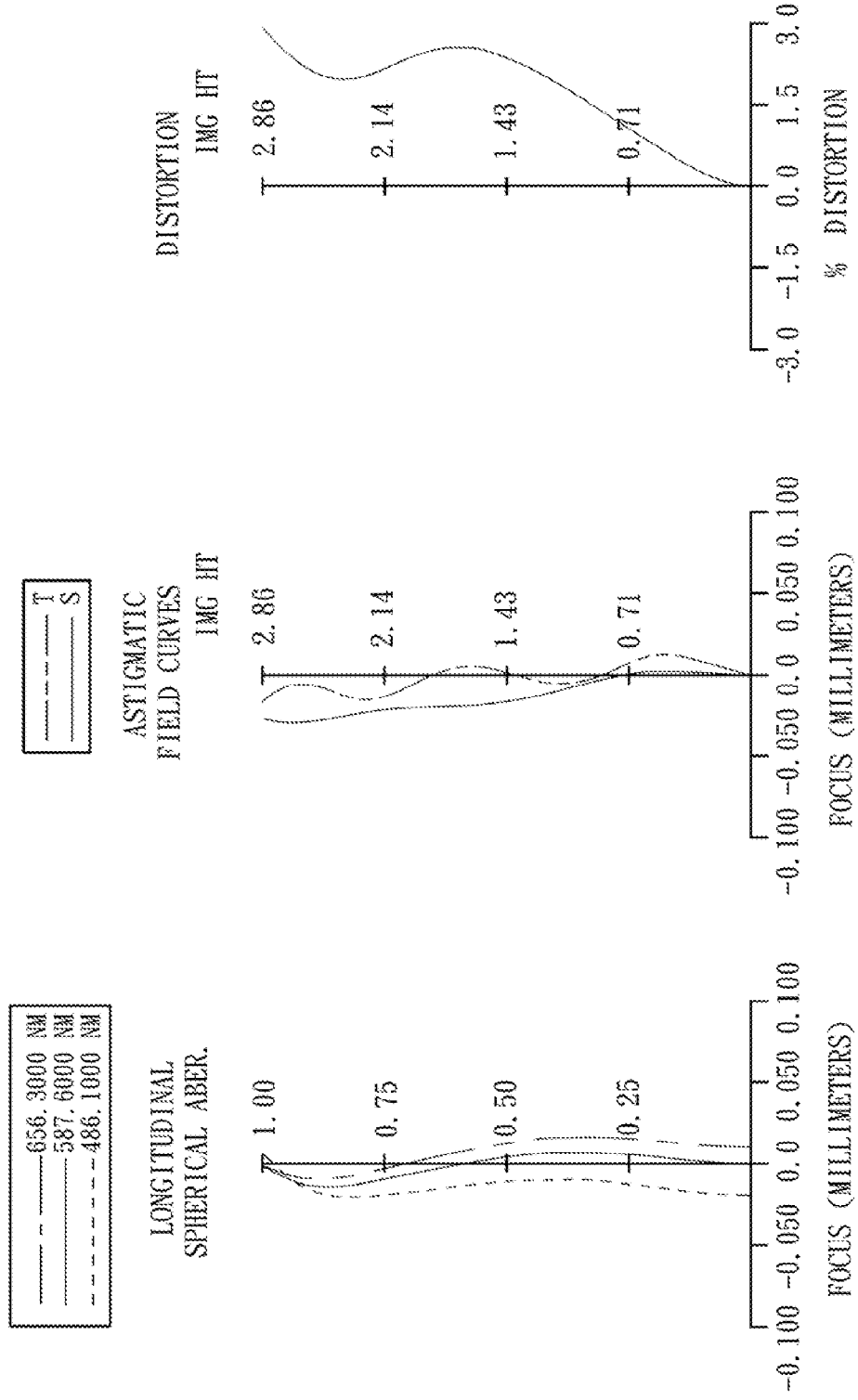
FIG. 2 shows spherical aberration curves, astigmatic field curves and a distortion curve of the image lens assembly according to the 1st embodiment.

FIG. 1 is a schematic view of an image lens assembly according to the 1st embodiment of the present disclosure. FIG. 2 shows spherical aberration curves, astigmatic field curves and a distortion curve of the image lens assembly according to the 1st embodiment. In FIG. 1, the image lens assembly includes, in order from an object side to an image side, an aperture stop 100, the first lens element 110, the second lens element 120, the third lens element 130, the fourth lens element 140, the fifth lens element 150, an IR-cut filter 170, an image plane 160 and an image sensor 180.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with positive refractive power has a convex object-side surface 151 and a convex image-side surface 152, and is made of plastic material. The object-side surface 151 and the image-side surface 152 of the fifth lens element 150 are aspheric. Furthermore, the fifth lens element 150 has inflection points formed on the object-side surface 151 thereof.

The IR-cut filter 170 is made of glass, and located between the fifth lens element 150 and the image plane 160, and will not affect the focal length of the image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

Wherein,

X is the distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient

In the image lens assembly according to the 1st embodiment, when a focal length of the image lens assembly is f, an f number of the image lens assembly is Fno, and half of the maximal field of view is HFOV, these parameters have the following values:

$f$=4.61 mm;

Fno=2.80; and

HFOV=31.1 degrees.

In the image lens assembly according to the 1st embodiment, when a refractive index of the second lens element 120 is N2, the following relationship is satisfied:

$N2$=1.640.

In the image lens assembly according to the 1st embodiment, when an Abbe number of the first lens element 110 is V1, and an Abbe number of the second lens element 120 is V2, the following relationship is satisfied:

$V1-V2$=32.6.

In the image lens assembly according to the 1st embodiment, when a central thickness of the fourth lens element 140 is CT4, and a central thickness of the fifth lens element 150 is CT5, the following relationship is satisfied:

$CT4/CT5$=0.16.

In the image lens assembly according to the 1st embodiment, when a curvature radius of an image-side surface 112 of the first lens element 110 is R2, a curvature radius of the object-side surface 121 of the second lens element 120 is R3, a curvature radius of the image-side surface 132 of the third lens element 130 is R6 and a curvature radius of the object-side surface 141 of the fourth lens element 140 is R7 the following relationships are satisfied:

$|R3/R2|$=0.47; and $|R7/R6|$=0.21.

In the image lens assembly according to the 1st embodiment, when the focal length of the image lens assembly is f, a focal length of the second lens element 120 is f2, and a focal length of the fifth lens element 150 is f5, the following relationships are satisfied:

$f/f2$=−0.87; and $f/f5$=0.30.

In the image lens assembly according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following relationship is satisfied:

$SD/TD$=0.93.

In the image lens assembly according to the 1st embodiment, when an axial distance between the image-side surface 152 of the fifth lens element 150 and the image plane 160 is BFL, an axial distance between the object-side surface 111 of the first lens element 110 and the image plane 160 is TTL, and a maximum image height of the image lens assembly is ImgH which here is a half of the diagonal length of the photosensitive area of the image sensor 180 on the image plane 160, the following relationships are satisfied:

$BFL/TTL$=0.24; and $TTL/ImgH$=1.86.

The detailed optical data of the 1st embodiment are shown in Table 1 and the aspheric surface data are shown in Table 2 below.

TABLE 1

1st Embodiment
f = 4.61 mm, Fno = 2.80, HFOV = 31.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.282 | | | | |
| 2 | Lens 1 | 1.352850 (ASP) | 0.493 | Plastic | 1.544 | 55.9 | 3.10 |
| 3 | | 5.959900 (ASP) | 0.070 | | | | |
| 4 | Lens 2 | 2.810130 (ASP) | 0.240 | Plastic | 1.640 | 23.3 | −5.27 |
| 5 | | 1.481880 (ASP) | 0.335 | | | | |
| 6 | Lens 3 | 577.6314400 (ASP) | 0.538 | Plastic | 1.544 | 55.9 | 4.73 |
| 7 | | −2.584880 (ASP) | 0.545 | | | | |
| 8 | Lens 4 | −0.541920 (ASP) | 0.240 | Plastic | 1.544 | 55.9 | −4.85 |
| 9 | | −0.788540 (ASP) | 0.070 | | | | |
| 10 | Lens 5 | 9.407700 (ASP) | 1.500 | Plastic | 1.544 | 55.9 | 15.58 |
| 11 | | −81.037300 (ASP) | 0.700 | | | | |
| 12 | IR-cut filter | Plano | 0.300 | Glass | 1.517 | 64.2 | — |
| 13 | | Plano | 0.372 | | | | |
| 14 | Image | Plano | — | | | | |

Note:
Reference wavelength (d-line) is 587.6 nm.

TABLE 2

Aspheric Coefficients

| Surface # | | | | | |
|---|---|---|---|---|---|
| | 2 | 3 | 4 | 5 | 6 |
| k = | 3.56659E−01 | 9.37809E−01 | −1.60043E+01 | −6.59159E−01 | 2.00002E+00 |
| A4 = | −3.67702E−03 | −2.04986E−02 | −6.02286E−02 | −9.32053E−02 | −7.78799E−02 |
| A6 = | 1.67469E−02 | 4.25767E−02 | 6.78411E−02 | 1.96354E−02 | 3.87763E−02 |
| A8 = | −5.06091E−02 | 2.73708E−02 | 3.59358E−02 | −6.25513E−02 | 1.71683E−02 |
| A10 = | 8.25083E−02 | −1.05083E−01 | −1.48163E−01 | 1.19428E−01 | 9.15411E−02 |
| A12 = | −5.52267E−02 | | | | −2.08048E−02 |
| A14 = | | | | | −3.77529E−03 |
| A16 = | | | | | −3.61524E−04 |

| Surface # | | | | | |
|---|---|---|---|---|---|
| | 7 | 8 | 9 | 10 | 11 |
| k = | 2.00000E+00 | −1.29328E+00 | −1.54006E+00 | −5.00000E+01 | −1.00000E+00 |
| A4 = | −7.56473E−02 | 2.76599E−01 | 2.10996E−01 | −8.32796E−02 | −1.70494E−02 |
| A6 = | 7.55698E−02 | 2.63747E−02 | −1.98068E−02 | 7.03070E−04 | −3.48853E−03 |
| A8 = | 8.23798E−02 | −3.94709E−02 | −2.69406E−02 | −2.74733E−03 | −1.13191E−04 |
| A10 = | −4.12300E−02 | −6.07634E−02 | −7.36789E−03 | 1.52066E−03 | 7.05033E−05 |
| A12 = | | 1.26448E−02 | 3.24229E−03 | | −2.07615E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
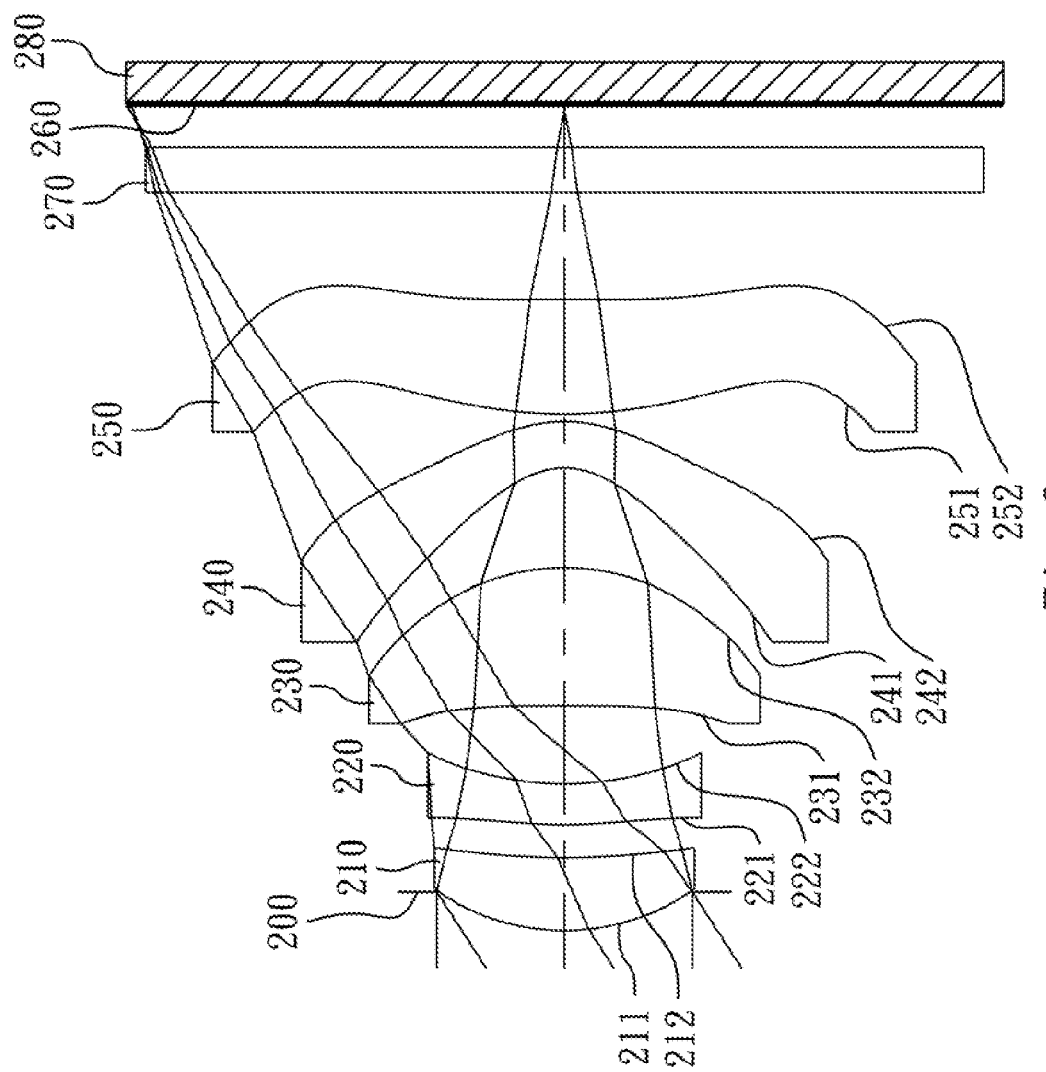
FIG. 3 is a schematic view of an image lens assembly according to the 2nd embodiment of the present disclosure.
Figure 4:
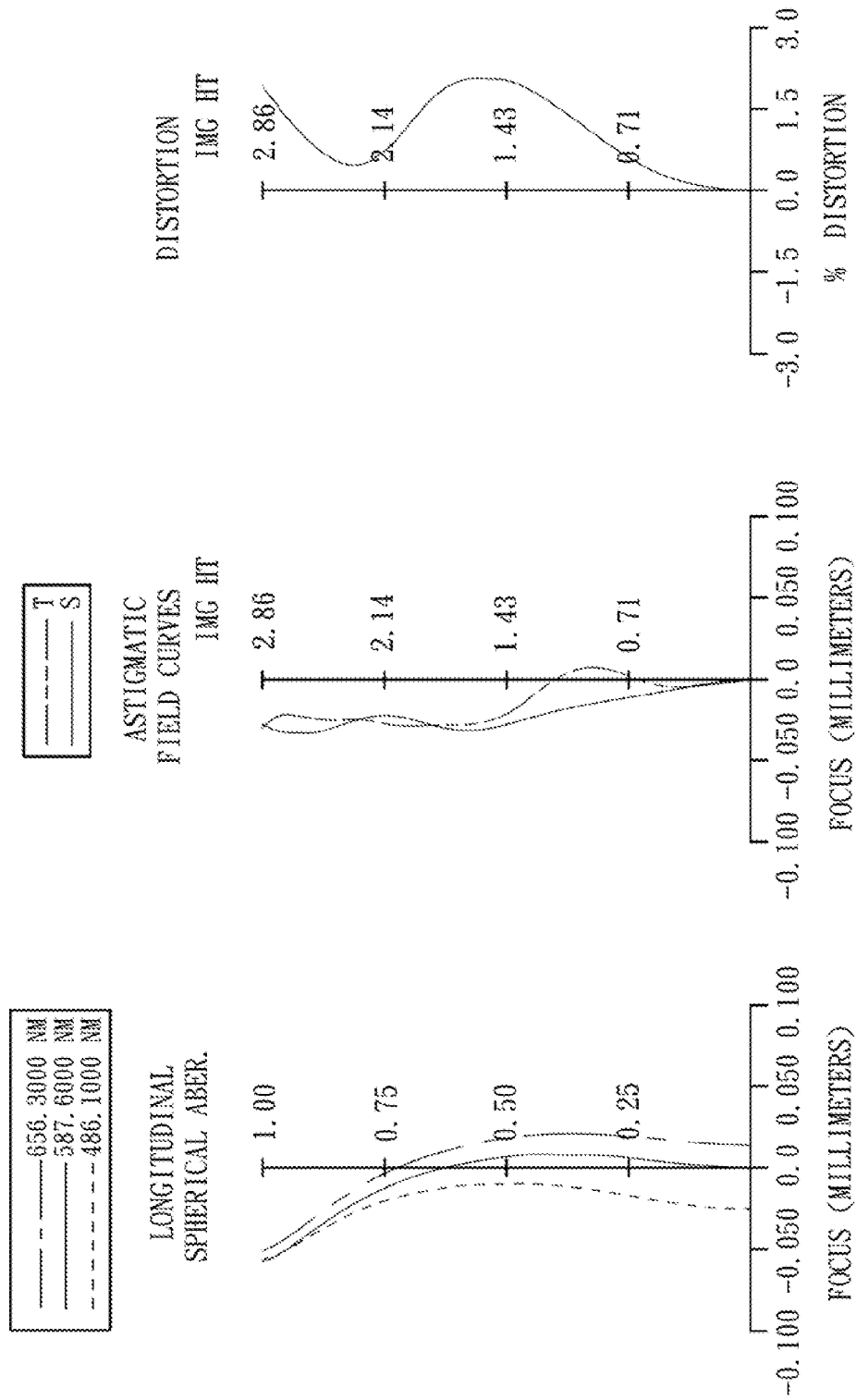
FIG. 4 shows spherical aberration curves, astigmatic field curves and a distortion curve of the image lens assembly according to the 2nd embodiment.

FIG. 3 is a schematic view of an image lens assembly according to the 2nd embodiment of the present disclosure. FIG. 4 shows spherical aberration curves, astigmatic field curves and a distortion curve of the image lens assembly according to the 2nd embodiment. In FIG. 3, the image lens assembly includes, in order from an object side to an image side, an aperture stop 200, the first lens element 210 the second lens element 220, the third lens element 230, the fourth lens element 240, the fifth lens element 250, an IR-cut filter 270, an image plane 260 and an image sensor 280.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a concave object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The fifth lens element 250 with positive refractive power has a convex object-side surface 251 and a convex image-side surface 252, and is made of plastic material. The object-side surface 251 and the image-side surface 252 of the fifth lens element 250 are aspheric. Furthermore, the fifth lens element 250 has inflection points formed on the object-side surface 251 and the image-side surface 252 thereof.

The IR-cut filter 270 is made of glass, and located between the fifth lens element 250 and the image plane 260, and will not affect the focal length of the image lens assembly.

The detailed optical data of the 2nd embodiment are shown in Table 3 and the aspheric surface data are shown in Table 4 below.

TABLE 3

2nd Embodiment
f = 4.34 mm, Fno = 2.60, HFOV = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.253 | | | | |
| 2 | Lens 1 | 1.491290 (ASP) | 0.479 | Plastic | 1.544 | 55.9 | 4.04 |
| 3 | | 4.104500 (ASP) | 0.212 | | | | |
| 4 | Lens 2 | 2.886260 (ASP) | 0.266 | Plastic | 1.650 | 21.4 | −7.55 |
| 5 | | 1.751080 (ASP) | 0.512 | | | | |
| 6 | Lens 3 | −30.769200 (ASP) | 0.901 | Plastic | 1.535 | 56.3 | 3.09 |
| 7 | | −1.583810 (ASP) | 0.658 | | | | |

TABLE 3-continued

2nd Embodiment
f = 4.34 mm, Fno = 2.60, HFOV = 32.9 deg.

| Surface # | | Curvature Radius | Thickness | Material | Index | Abbe # | Focal length |
|---|---|---|---|---|---|---|---|
| 8 | Lens 4 | −0.502930 (ASP) | 0.300 | Plastic | 1.544 | 55.9 | −2.54 |
| 9 | | 0.956680 (ASP) | 0.050 | | | | |
| 10 | Lens 5 | 3.045300 (ASP) | 0.750 | Plastic | 1.535 | 56.3 | 5.09 |
| 11 | | −23.386300 (ASP) | 0.700 | | | | |
| 12 | IR-cut filter | Plano | 0.300 | Glass | 1.517 | 64.2 | — |
| 13 | | Plano | 0.278 | | | | |
| 14 | Image | Plano | — | | | | |

Note:
Reference wavelength (d-line) is 587.6 nm.

TABLE 4

Aspheric Coefficients

| | Surface # | | | | |
|---|---|---|---|---|---|
| | 2 | 3 | 4 | 5 | 6 |
| k = | 6.92784E−01 | −1.93975E+01 | −2.00000E+01 | −2.76879E+00 | −1.81661E+01 |
| A4 = | −2.40428E−02 | −5.34363E−02 | −1.62044E−01 | −1.32472E−01 | −7.37354E−02 |
| A6 = | 6.68164E−03 | 4.56558E−02 | 4.60469E−02 | 1.87077E−01 | 7.65262E−03 |
| A8 = | −3.69821E−02 | −1.32109E−02 | 1.17205E−01 | −3.13091E−02 | −5.37555E−02 |
| A10 = | 3.46492E−02 | 2.85115E−02 | −8.05910E−02 | 2.04871E−02 | 8.98537E−02 |
| A12 = | −1.44108E−02 | | | | −2.26239E−02 |
| A14 = | | | | | −5.00357E−02 |
| A16 = | | | | | 2.95514E−02 |

| | Surface # | | | | |
|---|---|---|---|---|---|
| | 7 | 8 | 9 | 10 | 11 |
| k = | −1.54403E−02 | −1.30236E+00 | −1.77793E+00 | −1.61393E+00 | −1.00000E+00 |
| A4 = | −4.88972E−02 | 1.51809E−01 | 1.46276E−01 | −1.49734E−02 | 9.82928E−02 |
| A6 = | −8.52655E−03 | −5.06205E−02 | −4.59719E−02 | 3.09379E−03 | −4.43823E−02 |
| A8 = | 4.29814E−02 | 1.77033E−02 | −7.51203E−02 | −5.92767E−03 | 6.99049E−03 |
| A10 = | −1.70802E−02 | −2.03575E−02 | 4.86855E−03 | 8.38677E−04 | −6.69552E−04 |
| A12 = | | 5.11571E−03 | −6.76390E−04 | | 3.73376E−05 |

In the mage lens assembly according to the 2nd embodiment, the definitions of f, Fno, HFOV, N2, V1, V2, CT4, CT5, R2, R3, R6, R7, f2, f5, SD, TD, BFL, TTL and ImgH are the same as those stated in the 1st embodiment with corresponding values for the 2nd embodiment. Moreover, these parameters can be calculated from Table 3 and Table 4 as the following values and satisfy the following relationships:

| f (mm) | 4.34 | |R7/R6| | 0.32 |
|---|---|---|---|
| Fno | 2.60 | f/f2 | −0.56 |
| HFOV (deg.) | 32.9 | f/f5 | 0.85 |
| N2 | 1.650 | SD/TD | 0.94 |
| V1 − V2 | 34.5 | BFL/TTL | 0.22 |
| CT4/CT5 | 0.40 | TTL/ImgH | 1.86 |
| |R3/R2| | 0.70 | | |

3rd Embodiment

Figure 5:
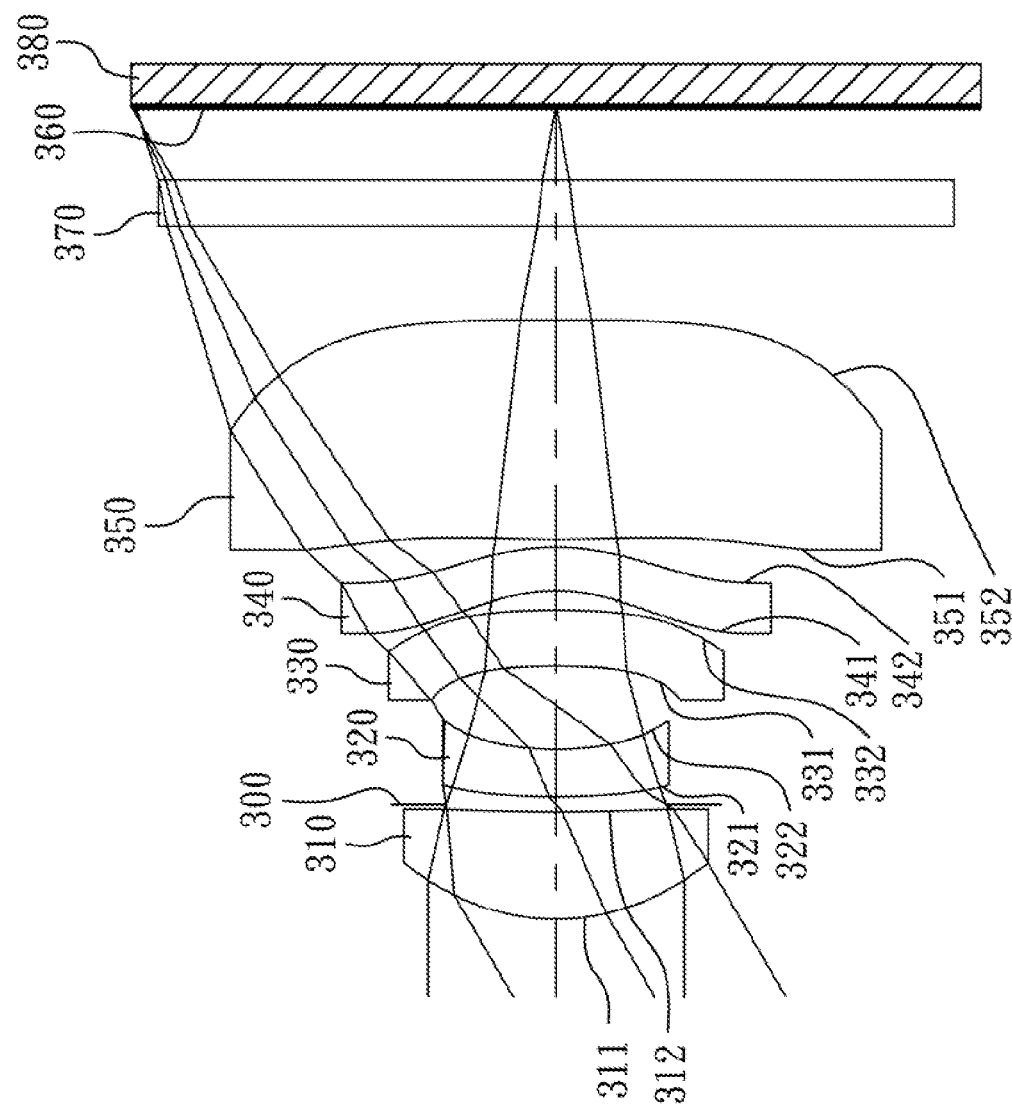
FIG. 5 is a schematic view of an image lens assembly according to the 3rd embodiment of the present disclosure.
Figure 6:
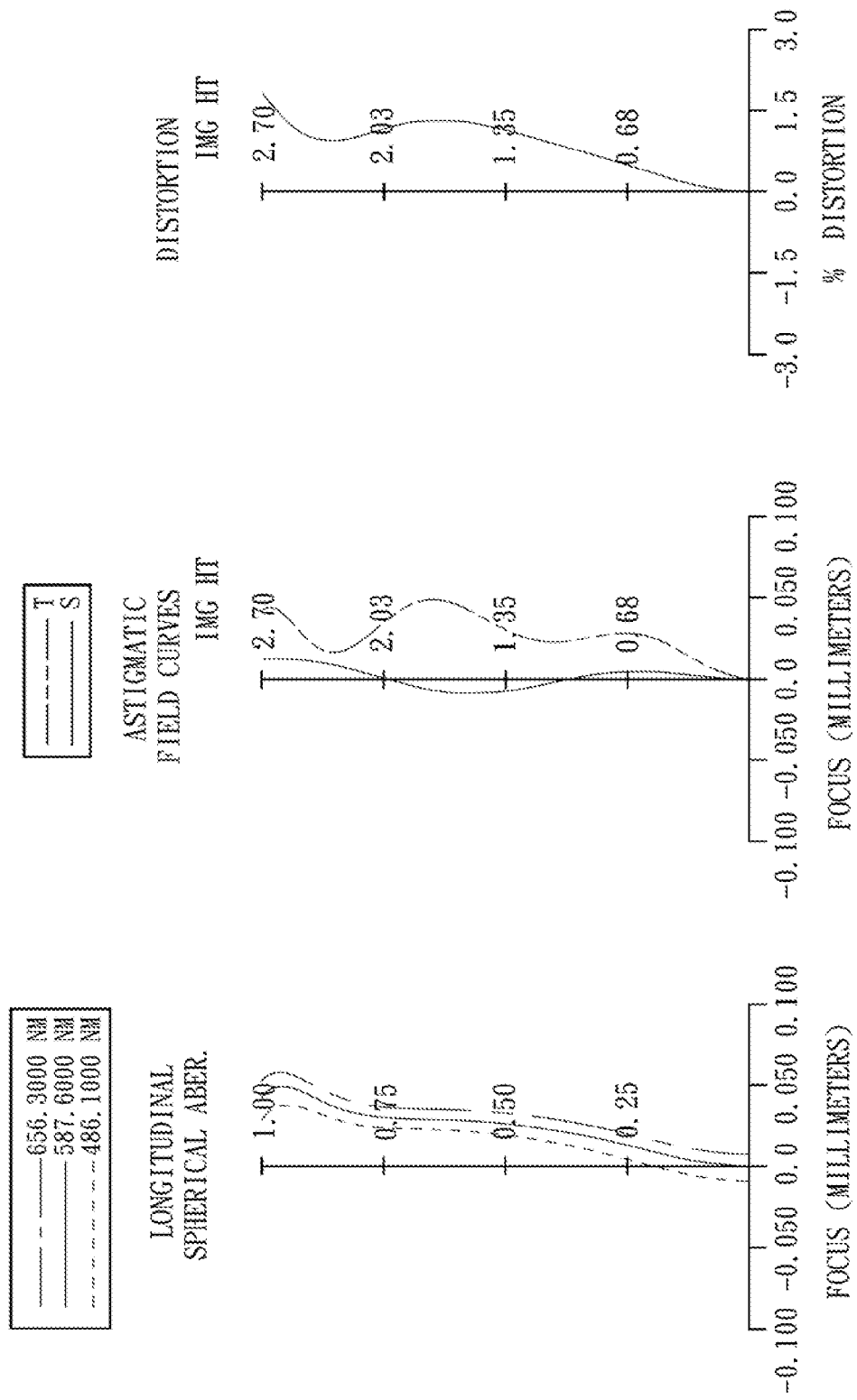
FIG. 6 shows spherical aberration curves, astigmatic field curves and a distortion curve of the image lens assembly according to the 3rd embodiment.

FIG. 5 is a schematic view of an image lens assembly according to the 3rd embodiment of the present disclosure. FIG. 6 shows spherical aberration curves, astigmatic field curves and a distortion curve of the image lens assembly according to the 3rd embodiment. In FIG. 5, the image lens assembly includes, in order from an object side to an image side, the first lens element 310, an aperture stop 300, the second lens element 320, the third lens element 330, the fourth lens element 340, the fifth lens element 350, an IR-cut filter 370, an image plane 360 and an image sensor 380.

The first lens element 310 with positive refractive power has a convex object-side surface 311 and a concave image-side surface 312, and is made of glass. The object-side surface 311 and the image-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric.

The third lens element 330 with negative refractive power has a concave object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with positive refractive power has a convex object-side surface 351 and a convex image-side surface 352, and is made of plastic material. The object-side surface 351 and the image-side surface 352 of the fifth lens element 350 are aspheric. Furthermore, the fifth lens element 350 has inflection points formed on the object-side surface 351 thereof.

The IR-cut filter 370 is made of glass, and located between the fifth lens element 350 and the image plane 360, and will not affect the focal length of the image lens assembly.

The detailed optical data of the 3rd embodiment are shown in Table 5 and the aspheric surface data are shown in Table 6 below.

| f (mm) | 4.58 | \|R7/R6\| | 0.22 |
|---|---|---|---|
| Fno | 2.80 | f/f2 | −0.87 |
| HFOV (deg.) | 29.9 | f/f5 | 0.19 |
| N2 | 1.640 | SD/TD | 0.81 |
| V1 − V2 | 37.3 | BFL/TTL | 0.25 |
| CT4/CT5 | 0.20 | TTL/ImgH | 1.89 |
| \|R3/R2\| | 0.38 | | |

TABLE 5

3rd Embodiment
f = 4.58 mm, Fno = 2.80, HFOV = 29.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.411340 (ASP) | 0.684 | Glass | 1.603 | 60.6 | 2.60 |
| 2 | | 11.589900 (ASP) | 0.048 | | | | |
| 3 | Ape. Stop | Plano | 0.050 | | | | |
| 4 | Lens 2 | 4.389400 (ASP) | 0.306 | Plastic | 1.640 | 23.3 | −5.28 |
| 5 | | 1.857890 (ASP) | 0.529 | | | | |
| 6 | Lens 3 | −4.211500 (ASP) | 0.360 | Plastic | 1.640 | 23.3 | −38.01 |
| 7 | | −5.263600 (ASP) | 0.120 | | | | |
| 8 | Lens 4 | −1.175220 (ASP) | 0.280 | Plastic | 1.544 | 55.9 | −20.42 |
| 9 | | −1.424580 (ASP) | 0.050 | | | | |
| 10 | Lens 5 | 15.024100 (ASP) | 1.400 | Plastic | 1.535 | 56.3 | 24.33 |
| 11 | | −93.633000 (ASP) | 0.600 | | | | |
| 12 | IR-cut filter | Plano | 0.300 | Glass | 1.517 | 64.2 | — |
| 13 | | Plano | 0.466 | | | | |
| 14 | Image | Plano | — | | | | |

Note:
Reference wavelength (d-line) is 587.6 nm.

TABLE 6

Aspheric Coefficients

| | Surface # | | | | |
|---|---|---|---|---|---|
| | 1 | 2 | 4 | 5 | 6 |
| k = | −6.25828E+00 | −1.00000E+01 | −3.25286E−01 | −1.00000E+00 | −3.46083E+00 |
| A4 = | 2.63734E−01 | −4.13550E−02 | −2.25620E−02 | 5.82522E−02 | −1.77495E−01 |
| A6 = | −2.59359E−01 | 4.10118E−02 | 1.12745E−01 | 1.15136E−01 | −2.67854E−01 |
| A8 = | 2.93460E−01 | −5.06806E−02 | 5.89988E−02 | 3.55626E−02 | 3.02728E−01 |
| A10 = | −2.61429E−01 | 8.81505E−02 | −1.51751E−01 | 3.96682E−02 | −2.71307E−01 |
| A12 = | 1.26830E−01 | 4.99270E−02 | 3.94072E−01 | 2.94559E−01 | −3.92566E−01 |
| A14 = | −2.07054E−02 | −1.28206E−01 | −2.56665E−01 | 1.12872E−01 | |

| | Surface # | | | | |
|---|---|---|---|---|---|
| | 7 | 8 | 9 | 10 | 11 |
| k = | −1.17939E+01 | −2.96772E−01 | −6.08398E+00 | −1.00000E+00 | −1.00000E+00 |
| A4 = | −1.11976E−01 | 2.36848E−01 | −4.08674E−02 | −3.46434E−02 | −3.94984E−02 |
| A6 = | −6.22061E−02 | 9.72640E−02 | 1.54135E−01 | −1.00395E−02 | 1.09812E−02 |
| A8 = | 7.59510E−02 | −2.40008E−01 | −1.19623E−01 | 9.30729E−03 | −5.84422E−03 |
| A10 = | −7.19154E−02 | 2.89649E−01 | 6.08073E−02 | −9.91210E−04 | 1.38137E−03 |
| A12 = | 3.74298E−02 | −1.66250E−01 | −2.03556E−02 | −2.05353E−04 | −1.75441E−04 |
| A14 = | | 3.73959E−02 | 2.93456E−03 | 1.43400E−05 | 9.59097E−06 |

In the image lens assembly according to the 3rd embodiment, the definitions of f, Fno, HFOV, N2, V1, V2, CT4, CT5, R2, R3, R6, R7, f2, f5, SD, TD, BFL, TTL and ImgH are the same as those stated in the 1st embodiment with corresponding values for the 3rd embodiment. Moreover, these parameters can be calculated from Table 5 and Table 6 as the following values and satisfy the following relationships:

4th Embodiment

Figure 7:
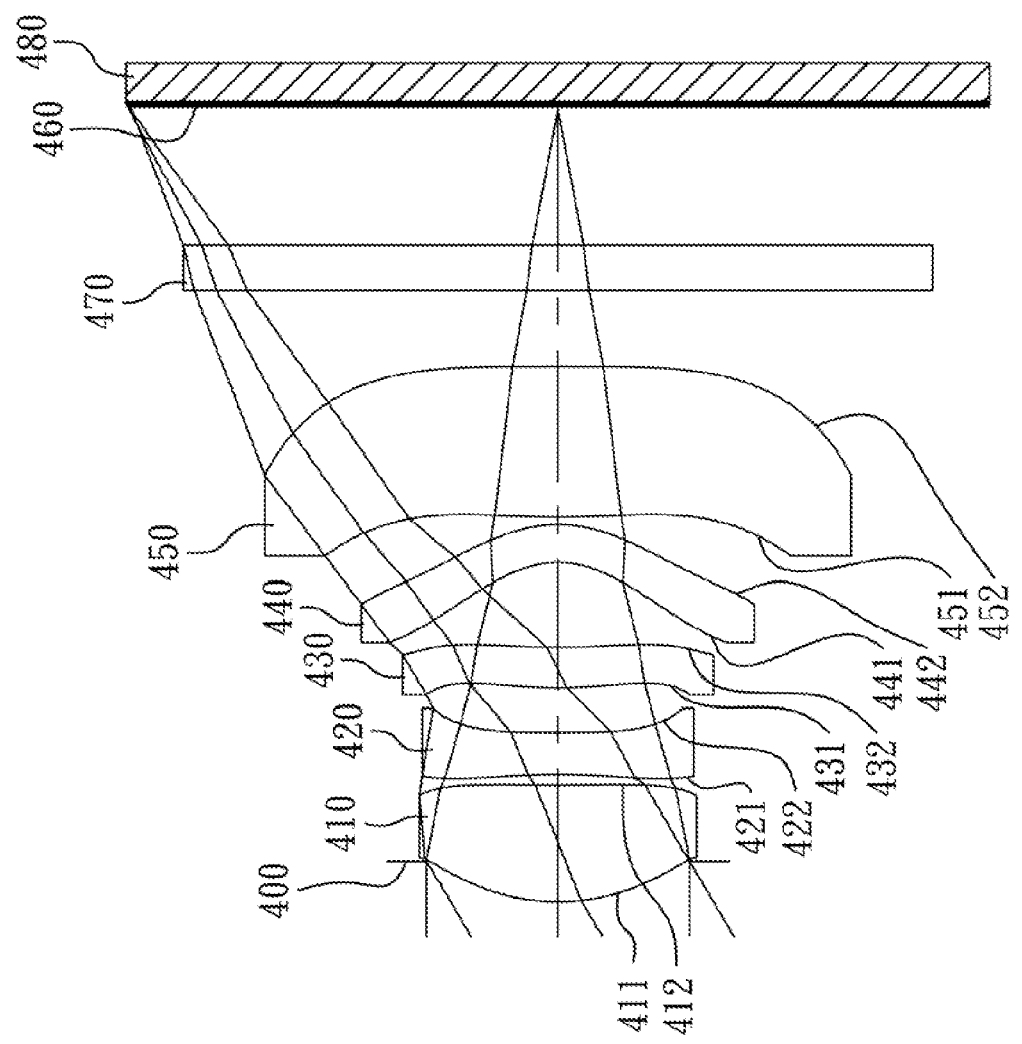
FIG. 7 is a schematic view of an image lens assembly according to the 4th embodiment of the present disclosure.
Figure 8:
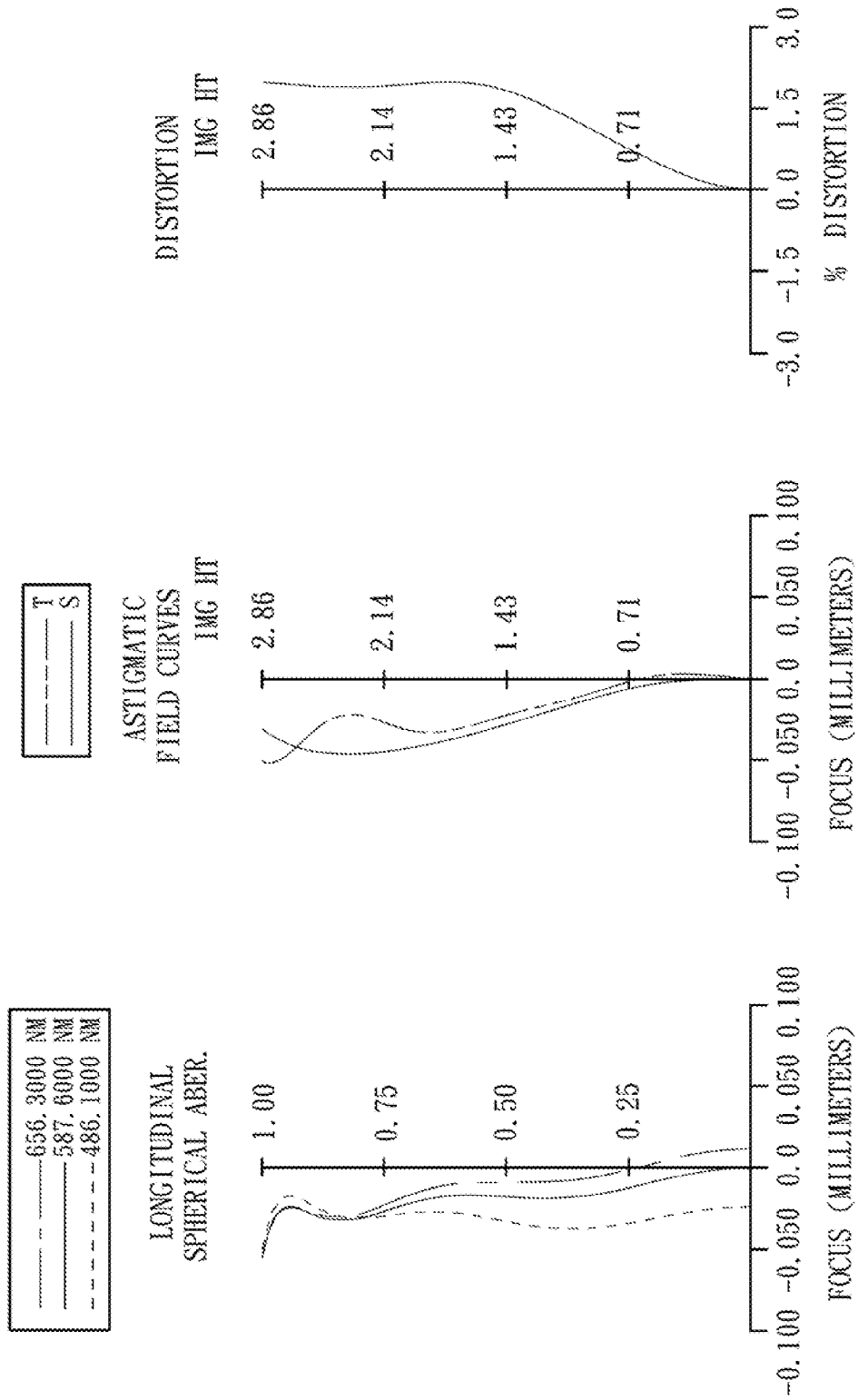
FIG. 8 shows spherical aberration curves, astigmatic field curves and a distortion curve of the image lens assembly according to the 4th embodiment.

FIG. 7 is a schematic view of an image lens assembly according to the 4th embodiment of the present disclosure. FIG. 8 shows spherical aberration curves, astigmatic field curves and a distortion curve of the image lens assembly according to the 4th embodiment. In FIG. 7, the image lens assembly includes, in order from an object side to an image side, an aperture stop 400, the first lens element 410 the second lens element 420, the third lens element 430, the fourth lens element 440, the fifth lens element 450, an IR-cut filter 470, an image plane 460 and an image sensor 480.

The first lens element 410 with positive refractive power has a convex object-side surface 411 and a concave image-side surface 412, and is made of plastic material. The object-side surface 411 and the image-side surface 412 of the first lens element 410 are aspheric.

The second lens element 420 with negative refractive power has a concave object-side surface 421 and a concave image-side surface 422, and is made of plastic material. The object-side surface 421 and the image-side surface 422 of the second lens element 420 are aspheric.

The third lens element 430 with positive refractive power has a convex object-side surface 431 and a concave image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with positive refractive power has a convex object-side surface 451 and a convex image-side surface 452, and is made of plastic material. The object-side surface 451 and the image-side surface 452 of the fifth lens element 450 are aspheric. Furthermore, the fifth lens element 450 has inflection points formed on the object-side surface 451 thereof.

The IR-cut filter 470 is made of glass, and located between the fifth lens element 450 and the image plane 460, and will not affect the focal length of the image lens assembly.

The detailed optical data of the 4th embodiment are shown in Table 7 and the aspheric surface data are shown in Table 8 below.

TABLE 7

4th Embodiment
f = 4.78 mm, Fno = 2.75, HFOV = 30.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.272 | | | | |
| 2 | Lens 1 | 1.364140 (ASP) | 0.774 | Plastic | 1.544 | 55.9 | 2.66 |
| 3 | | 18.571600 (ASP) | 0.070 | | | | |
| 4 | Lens 2 | −4.232200 (ASP) | 0.278 | Plastic | 1.640 | 23.3 | −4.15 |
| 5 | | 7.317800 (ASP) | 0.295 | | | | |
| 6 | Lens 3 | 2.892630 (ASP) | 0.269 | Plastic | 1.640 | 23.3 | 10.11 |
| 7 | | 5.042900 (ASP) | 0.563 | | | | |
| 8 | Lens 4 | −0.627030 (ASP) | 0.250 | Plastic | 1.544 | 55.9 | −6.00 |
| 9 | | −0.884970 (ASP) | 0.050 | | | | |
| 10 | Lens 5 | 5.542800 (ASP) | 1.000 | Plastic | 1.530 | 55.8 | 9.91 |
| 11 | | −93.153200 (ASP) | 0.500 | | | | |
| 12 | IR-cut filter | Plano | 0.300 | Glass | 1.517 | 64.2 | — |
| 13 | | Plano | 0.934 | | | | |
| 14 | Image | Plano | — | | | | |

Note:
Reference wavelength (d-line) is 587.6 nm.

TABLE 8

Aspheric Coefficients

| | Surface # | | | | |
|---|---|---|---|---|---|
| | 2 | 3 | 4 | 5 | 6 |
| k = | 3.77681E−02 | 0.00000E+00 | −1.00000E+00 | −3.83556E+01 | −7.96060E+00 |
| A4 = | −9.07342E−03 | −7.69384E−02 | 9.34604E−02 | 1.00413E−01 | −1.63571E−01 |
| A6 = | −2.85062E−02 | −2.16233E−02 | 6.00407E−02 | 2.34587E−01 | −1.05446E−01 |
| A8 = | 3.88389E−03 | −3.13744E−02 | 1.05108E−01 | −2.12425E−01 | −2.96875E−02 |
| A10 = | −1.18224E−02 | −2.02184E−02 | −6.98909E−02 | 2.68507E−01 | −1.36952E−02 |
| A12 = | −5.08203E−02 | 3.89107E−03 | 4.04420E−02 | 6.04582E−02 | −3.29540E−02 |
| A14 = | | | | | 2.24195E−03 |
| A16 = | | | | | −7.25213E−04 |

| | Surface # | | | | |
|---|---|---|---|---|---|
| | 7 | 8 | 9 | 10 | 11 |
| k = | −3.72155E+01 | −1.30673E+00 | −1.32937E+00 | −9.01962E+01 | 0.00000E+00 |
| A4 = | −7.83460E−02 | 2.85795E−01 | 1.63171E−01 | −8.51898E−02 | −3.86267E−02 |
| A6 = | −8.09147E−02 | −8.37819E−02 | −6.76477E−03 | 9.97623E−03 | −1.72396E−03 |
| A8 = | −5.84695E−03 | −1.99879E−02 | −1.01206E−02 | −1.42321E−03 | −3.99538E−04 |
| A10 = | 1.34653E−02 | 1.52627E−02 | −5.99580E−03 | 2.77125E−04 | 2.37944E−04 |
| A12 = | 3.08492E−02 | 4.13375E−03 | 1.41318E−03 | 9.56106E−06 | −3.50921E−05 |
| A14 = | | | | | −5.58646E−06 |

In the image lens assembly according to the 4th embodiment, the definitions of f, Fno, HFOV, N2, V1, V2, CT4, CT5, R2, R3 R6, R7, f2, f5, SD, TD, BFL, TTL and ImgH are the same as those stated in the 1st embodiment with corresponding values for the 4th embodiment. Moreover, these parameters can be calculated from Table 7 and Table 8 as the following values and satisfy the following relationships:

| f (mm) | 4.78 | |R7/R6| | 0.12 |
|---|---|---|---|
| Fno | 2.75 | f/f2 | −1.15 |
| HFOV (deg.) | 30.5 | f/f5 | 0.48 |
| N2 | 1.640 | SD/TD | 0.92 |
| V1 − V2 | 32.6 | BFL/TTL | 0.32 |
| CT4/CT5 | 0.25 | TTL/ImgH | 1.81 |
| |R3/R2| | 0.23 | | |

5th Embodiment

Figure 9:
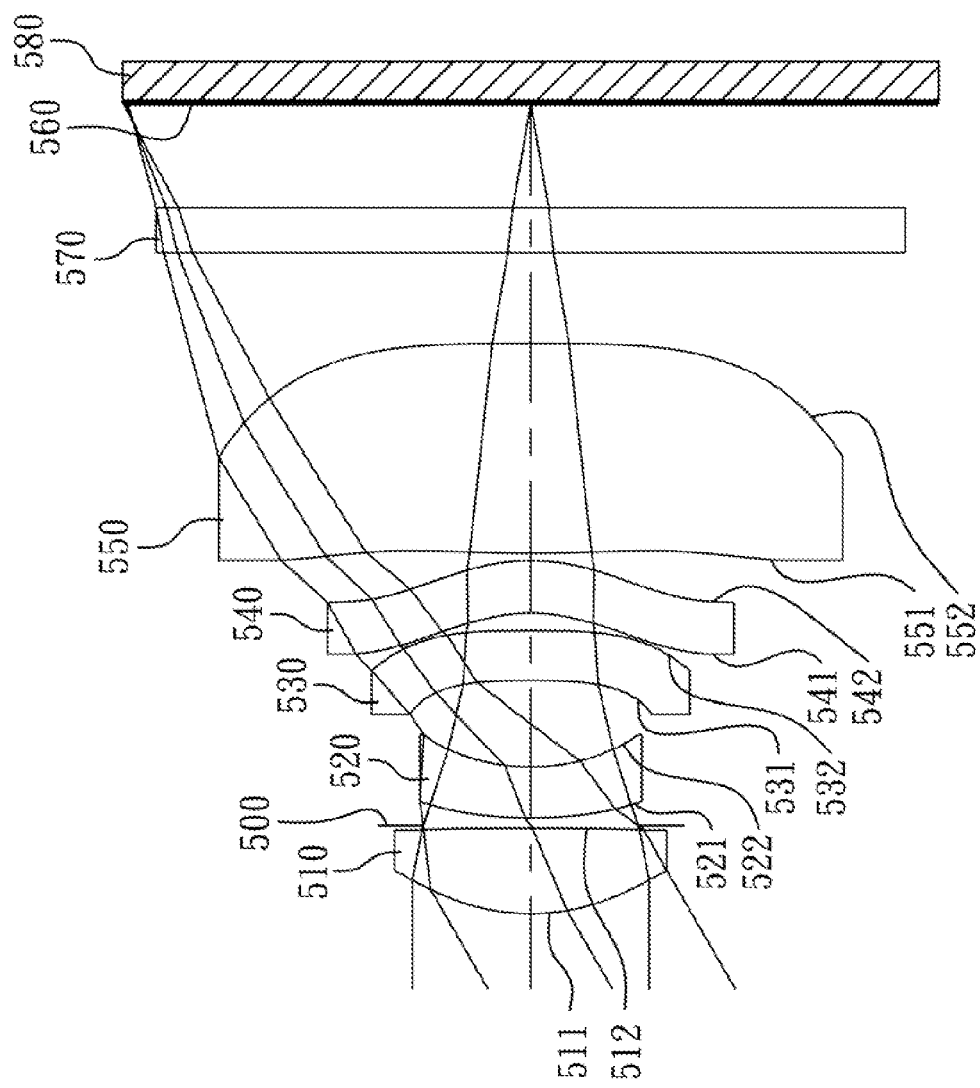
FIG. 9 is a schematic view of an image lens assembly according to the 5th embodiment of the present disclosure.
Figure 10:
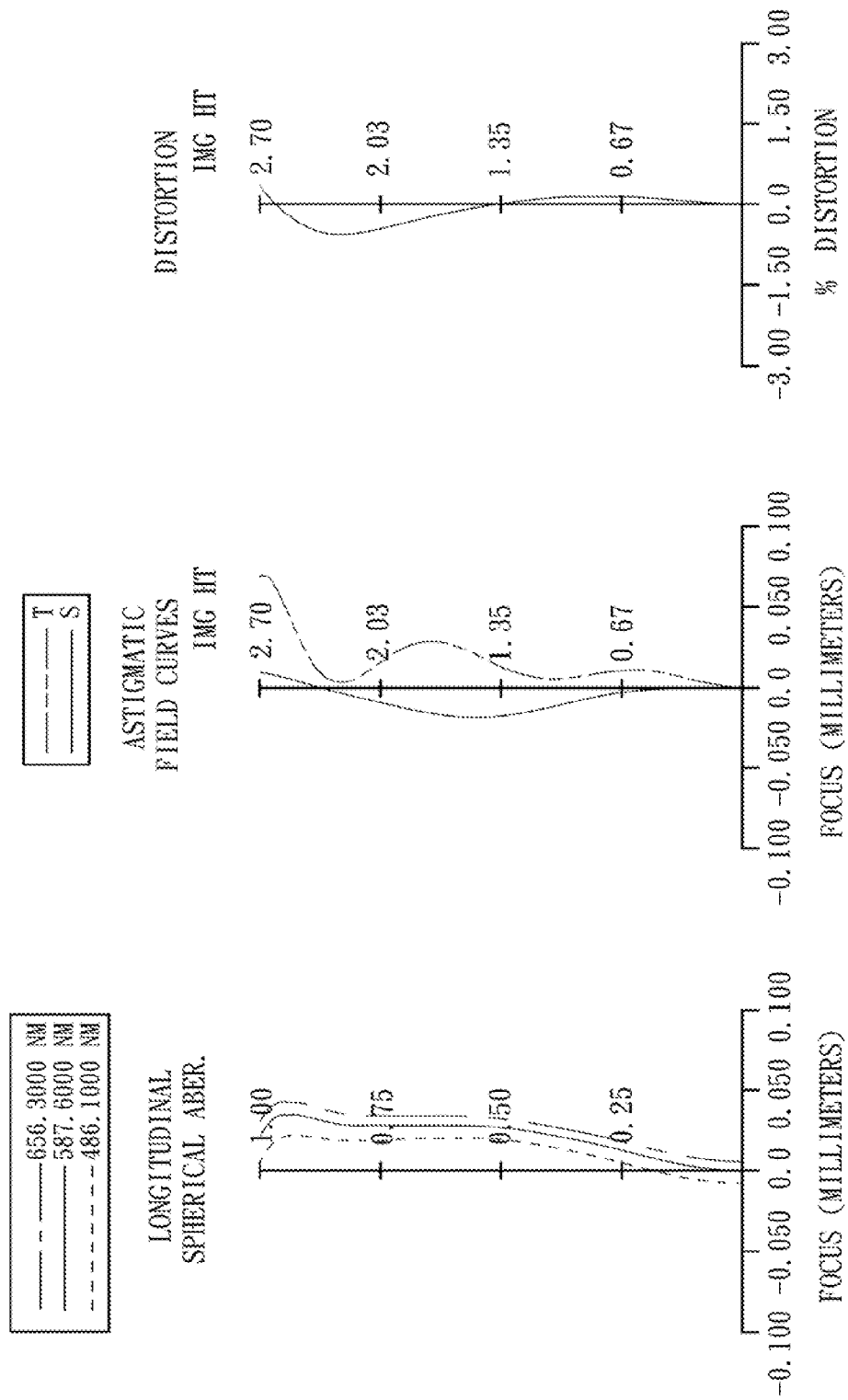
FIG. 10 shows spherical aberration curves, astigmatic field curves and a distortion curve of the image lens assembly according to the 5th embodiment.

FIG. 9 is a schematic view of an image lens assembly according to the 5th embodiment of the present disclosure. FIG. 10 shows spherical aberration curves, astigmatic field curves and a distortion curve of the image lens assembly according to the 5th embodiment. In FIG. 9, the image lens assembly includes, in order from an object side to an image side, the first lens element 510, an aperture stop 500 the second lens element 520, the third lens element 530, the fourth lens element 540, the fifth lens element 550, an IR-cut filter 570, an image plane 560 and an image sensor 580.

The first lens element 510 with positive refractive power has a convex object-side surface 511 and a convex object-side surface 512, and is made of plastic material. The object-side surface 511 and the object-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with negative refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with positive refractive power has a convex object-side surface 551 and a convex image-side surface 552, and is made of plastic material. The object-side surface 551 and the image-side surface 552 of the fifth lens element 550 are aspheric. Furthermore, the fifth lens element 550 has inflection points formed on the object-side surface 551 thereof.

The IR-cut filter 570 is made of glass, and located between the fifth lens element 550 and the image plane 560, and will not affect the focal length of the image lens assembly.

The detailed optical data of the 5th embodiment are shown in Table 9 and the aspheric surface data are shown in Table 10 below.

TABLE 9

5th Embodiment
f = 4.65 mm, Fno = 2.95, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.418100 (ASP) | 0.571 | Plastic | 1.544 | 55.9 | 2.57 |
| 2 | | −83.333300 (ASP) | 0.017 | | | | |
| 3 | Ape. Stop | Plano | 0.050 | | | | |
| 4 | Lens 2 | 2.710280 (ASP) | 0.340 | Plastic | 1.640 | 23.3 | −4.58 |
| 5 | | 1.339610 (ASP) | 0.577 | | | | |
| 6 | Lens 3 | −5.656400 (ASP) | 0.331 | Plastic | 1.640 | 23.3 | −20.62 |
| 7 | | −10.128900 (ASP) | 0.120 | | | | |
| 8 | Lens 4 | −1.148540 (ASP) | 0.346 | Plastic | 1.640 | 23.3 | −70.43 |
| 9 | | −1.317110 (ASP) | 0.050 | | | | |
| 10 | Lens 5 | 10.308800 (ASP) | 1.400 | Plastic | 1.544 | 55.9 | 17.15 |
| 11 | | −93.633000 (ASP) | 0.600 | | | | |
| 12 | IR-cut filter | Plano | 0.300 | Glass | 1.517 | 64.2 | — |
| 13 | | Plano | 0.702 | | | | |
| 14 | Image | Plano | — | | | | |

Note:
Reference wavelength (d-line) is 587.6 nm.

TABLE 10

Aspheric Coefficients

| Surface # | | | | | |
|---|---|---|---|---|---|
| | 1 | 2 | 4 | 5 | 6 |
| k = | −6.30524E+00 | −1.00000E+01 | −1.24363E+00 | −1.42346E+00 | 1.31823E+01 |
| A4 = | 2.59181E−01 | −1.54415E−02 | −2.52658E−02 | 4.54109E−02 | −2.19522E−01 |
| A6 = | −2.76088E−01 | 1.93672E−02 | 1.13655E−01 | 9.13649E−02 | −1.96037E−01 |
| A8 = | 2.89808E−01 | −1.20546E−01 | −5.38196E−02 | 1.29658E−01 | 1.95241E−01 |
| A10 = | −2.52498E−01 | 1.11520E−01 | −8.49315E−02 | −1.15068E−01 | −2.03118E−01 |

TABLE 10-continued

Aspheric Coefficients

| | | | | | |
|---|---|---|---|---|---|
| A12 = | 8.53859E−02 | 3.96427E−02 | 3.94072E−01 | 2.94559E−01 | −3.86302E−01 |
| A14 = | −1.74991E−02 | −1.28206E−01 | −2.56665E−01 | 1.12872E−01 | |

| | Surface # | | | | |
|---|---|---|---|---|---|
| | 7 | 8 | 9 | 10 | 11 |
| k = | 2.92271E+01 | −3.00433E−01 | −4.11429E+00 | −5.00653E−01 | −1.00000E+00 |
| A4 = | −1.47324E−01 | 2.44852E−01 | −3.85084E−02 | −3.64181E−02 | −4.97326E−02 |
| A6 = | −5.49952E−02 | 9.89886E−02 | 1.56813E−01 | −1.00684E−02 | 1.18334E−02 |
| A8 = | 7.72542E−02 | −2.39637E−01 | −1.18658E−01 | 9.08931E−03 | −5.17876E−03 |
| A10 = | −7.75731E−02 | 2.89934E−01 | 6.10142E−02 | −1.02833E−03 | 1.28709E−03 |
| A12 = | 3.53460E−02 | −1.66718E−01 | −2.03578E−02 | −2.09304E−04 | −1.92752E−04 |
| A14 = | | 3.73374E−02 | 2.75896E−03 | 3.04936E−05 | 1.27413E−05 |

In the image lens assembly according to the 5th embodiment, the definitions of f, Fno, HFOV, N2, V1, V2, CT4, CT5, R2, R3, R6, R7, f2, f5, SD, TD, BFL, TTL and ImgH are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 4.65 | |R7/R6| | 0.11 |
| Fno | 2.95 | f/f2 | −1.01 |
| HFOV (deg.) | 30.0 | f/f5 | 0.27 |
| N2 | 1.640 | SD/TD | 0.85 |
| V1 − V2 | 32.6 | BFL/TTL | 0.28 |
| CT4/CT5 | 0.25 | TTL/ImgH | 1.96 |
| |R3/R2| | 0.03 | | |

6th Embodiment

Figure 11:
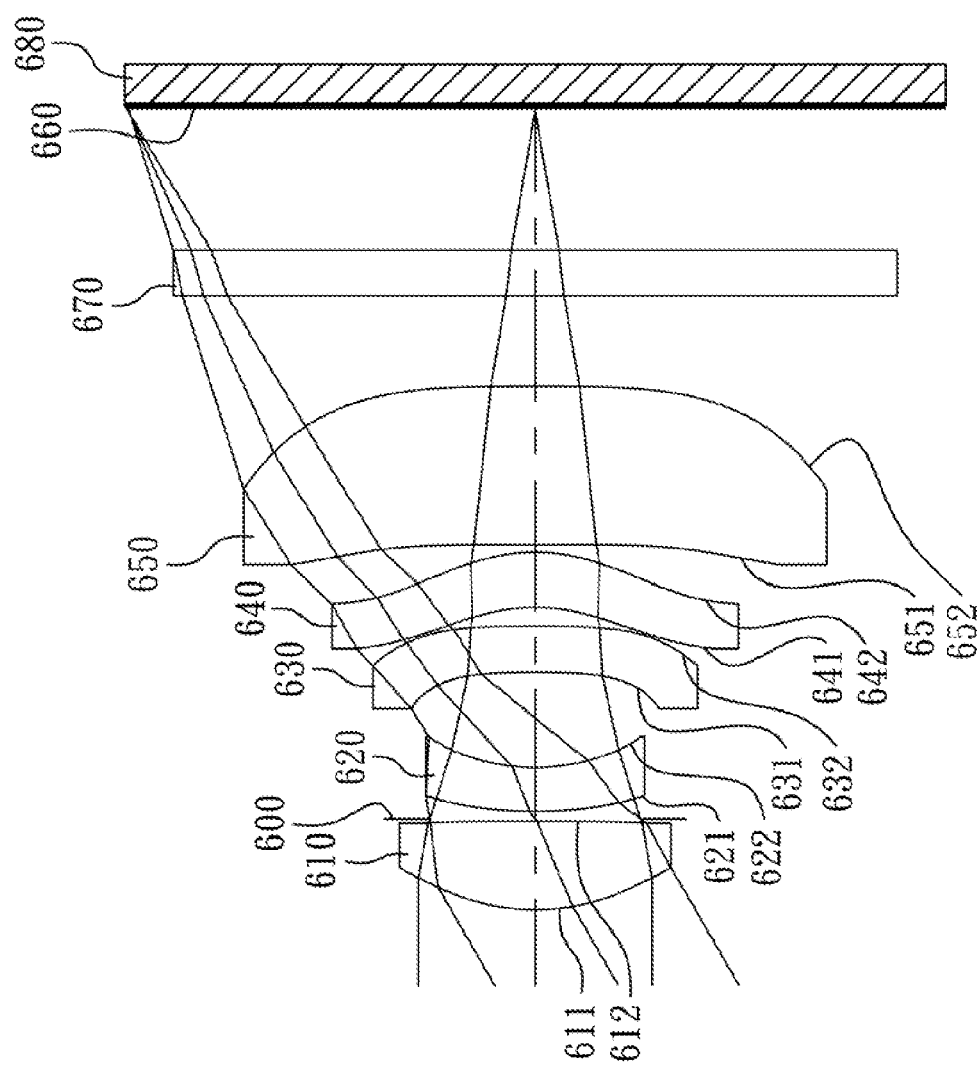
FIG. 11 is a schematic view of an image lens assembly according to the 6th embodiment of the present disclosure.
Figure 12:
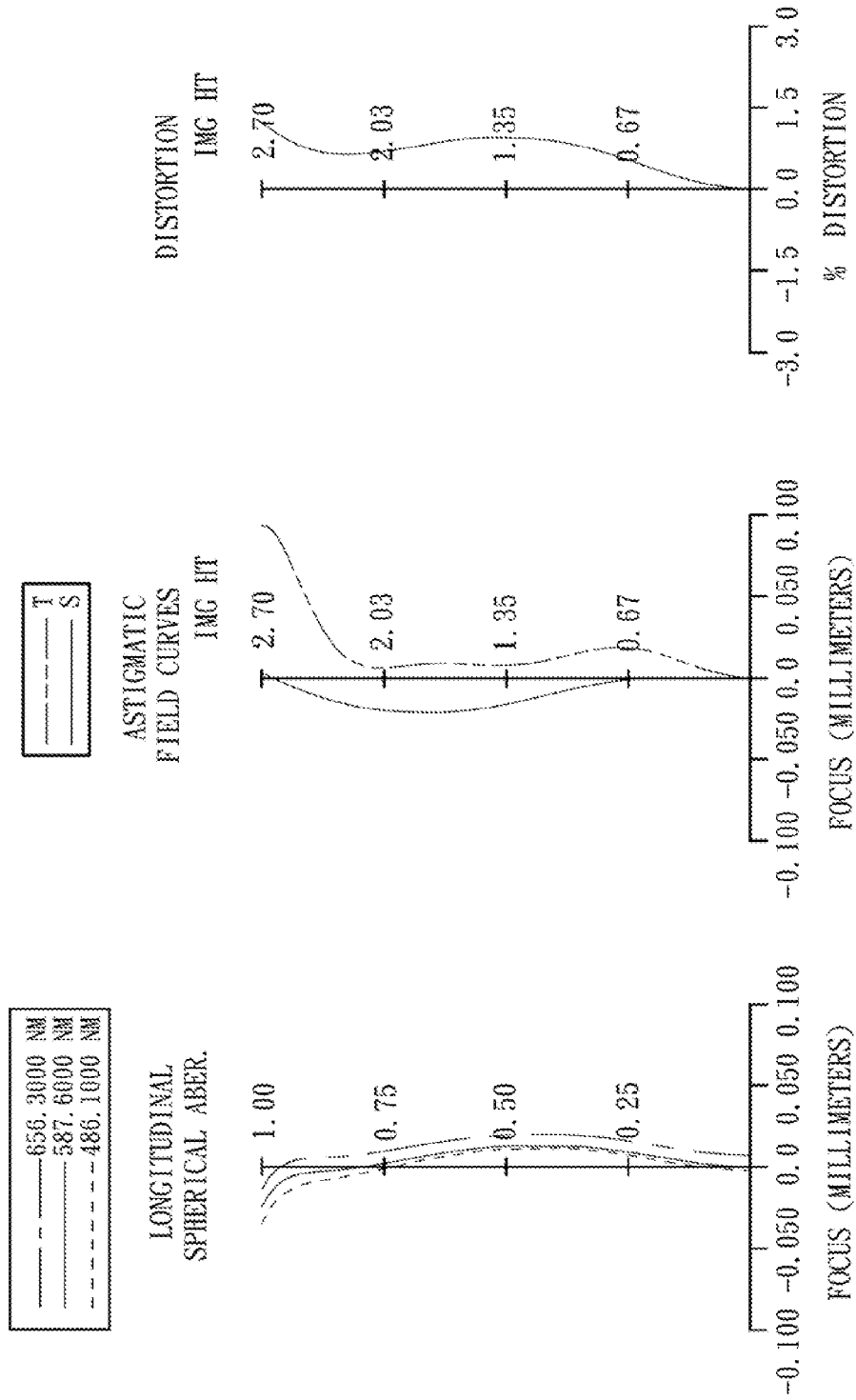
FIG. 12 shows spherical aberration curves, astigmatic field curves and a distortion curve of the image lens assembly according to the 6th embodiment.

FIG. 11 is a schematic view of an image lens assembly according to the 6th embodiment of the present disclosure. FIG. 12 shows spherical aberration curves, astigmatic field curves and a distortion curve of the image lens assembly according to the 6th embodiment. In FIG. 11, the image lens assembly includes, in order from an object side to an image side, the first lens element 610, an aperture stop 600, the second lens element 620, the third lens element 630, the fourth lens element 640, the fifth lens element 650, an IR-cut filter 670, an image plane 660 and an image sensor 680.

The first lens element 610 with positive refractive power has a convex object-side surface 611 and a convex object-side surface 612, and is made of plastic material. The object-side surface 611 and the object-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric.

The third lens element 630 with negative refractive power has a concave object-side surface 631 and a convex image-side surface 632, and is made of plastic material. The object-side surface 631 and the image-side surface 632 of the third lens element 630 are aspheric.

The fourth lens element 640 with positive refractive power has a concave object-side surface 641 and a convex image-side surface 642, and is made of plastic material. The object-side surface 641 and the image-side surface 642 of the fourth lens element 640 are aspheric.

The fifth lens element 650 with positive refractive power has a convex object-side surface 651 and a convex image-side surface 652, and is made of plastic material. The object-side surface 651 and the image-side surface 652 of the fifth lens element 650 are aspheric. Furthermore, the fifth lens element 650 has inflection points formed on the object-side surface 651 thereof.

The IR-cut filter 670 is made of glass, and located between the fifth lens element 650 and the image plane 660, and will not affect the focal length of the image lens assembly.

The detailed optical data of the 6th embodiment are shown in Table 11 and the aspheric surface data are shown in Table 12 below.

TABLE 11

6th Embodiment
f = 4.63 mm, Fno = 3.00, HFOV = 29.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.416370 (ASP) | 0.585 | Plastic | 1.544 | 55.9 | 2.54 |
| 2 | | −49.822700 (ASP) | 0.016 | | | | |
| 3 | Ape. Stop | Plano | 0.050 | | | | |
| 4 | Lens 2 | 2.745900 (ASP) | 0.290 | Plastic | 1.650 | 21.4 | −4.40 |
| 5 | | 1.341710 (ASP) | 0.630 | | | | |
| 6 | Lens 3 | −6.087600 (ASP) | 0.308 | Plastic | 1.640 | 23.3 | −18.92 |
| 7 | | −12.485200 (ASP) | 0.124 | | | | |
| 8 | Lens 4 | −1.158690 (ASP) | 0.360 | Plastic | 1.640 | 23.3 | 16.97 |
| 9 | | −1.173860 (ASP) | 0.050 | | | | |
| 10 | Lens 5 | 136.866200 (ASP) | 1.045 | Plastic | 1.544 | 55.9 | 100.26 |
| 11 | | −90.479500 (ASP) | 0.600 | | | | |

TABLE 11-continued

6th Embodiment
f = 4.63 mm, Fno = 3.00, HFOV = 29.9 deg.

| Surface # | | Curvature Radius | Thickness | Material | Index | Abbe # | Focal length |
|---|---|---|---|---|---|---|---|
| 12 | IR-cut filter | Plano | 0.300 | Glass | 1.517 | 64.2 | — |
| 13 | | Plano | 0.957 | | | | |
| 14 | Image | Plano | — | | | | |

Note:
Reference wavelength (d-line) is 587.6 nm.

TABLE 12

Aspheric Coefficients

| | Surface # | | | | |
|---|---|---|---|---|---|
| | 1 | 2 | 4 | 5 | 6 |
| k = | −6.35240E+00 | −4.53506E+00 | −1.12147E+00 | −1.48601E+00 | 1.87205E+01 |
| A4 = | 2.57937E−01 | −1.44464E−02 | −2.45589E−02 | 4.26721E−02 | −2.26312E−01 |
| A6 = | −2.78691E−01 | 1.80072E−02 | 1.17899E−01 | 9.02253E−02 | −1.97995E−01 |
| A8 = | 2.87085E−01 | −1.25735E−01 | −5.42756E−02 | 1.31383E−01 | 2.06633E−01 |
| A10 = | −2.51859E−01 | 1.08364E−01 | −8.50934E−02 | −1.43994E−01 | −2.00674E−01 |
| A12 = | 8.49123E−02 | 3.96427E−02 | 3.94072E−01 | 2.94559E−01 | −3.85072E−01 |
| A14 = | −1.73692E−02 | −1.28206E−01 | −2.56665E−01 | 1.12872E−01 | |

| | Surface # | | | | |
|---|---|---|---|---|---|
| | 7 | 8 | 9 | 10 | 11 |
| k = | 2.83866E+01 | −3.00773E−01 | −3.09257E+00 | 1.00000E+00 | −1.00000E+00 |
| A4 = | −1.49609E−01 | 2.42969E−01 | −3.78169E−02 | −3.27012E−02 | −6.09118E−02 |
| A6 = | −4.76475E−02 | 9.73538E−02 | 1.57643E−01 | −9.86148E−03 | 1.31322E−02 |
| A8 = | 7.71831E−02 | −2.40319E−01 | −1.18411E−01 | 9.12201E−03 | −5.20752E−03 |
| A10 = | −7.97931E−02 | 2.89683E−01 | 6.10869E−02 | −1.02595E−03 | 1.26199E−03 |
| A12 = | 3.37984E−02 | −1.66784E−01 | −2.03416E−02 | −2.10498E−04 | −1.95956E−04 |
| A14 = | | 3.73903E−02 | 2.75628E−03 | 2.96752E−05 | 1.29172E−05 |

In the image lens assembly according to the 6th embodiment, the definitions of f, Fno, HFOV, N2, V1, V2, CT4, CT5, R2, R3, R6, R7, f2, f5, SD, TD, BFL, TTL and ImgH are the same as those stated in the 1st embodiment with corresponding values for the 6th embodiment. Moreover, these parameters can be calculated from Table 11 and Table 12 as the following values and satisfy the following relationships:

| f (mm) | 4.63 | |R7/R6| | 0.09 |
| Fno | 3.00 | f/f2 | −1.05 |
| HFOV (deg.) | 29.9 | f/f5 | 0.05 |
| N2 | 1.650 | SD/TD | 0.83 |
| V1 − V2 | 34.5 | BFL/TTL | 0.34 |
| CT4/CT5 | 0.34 | TTL/ImgH | 1.93 |
| |R3/R2| | 0.06 | | |

7th Embodiment

Figure 13:
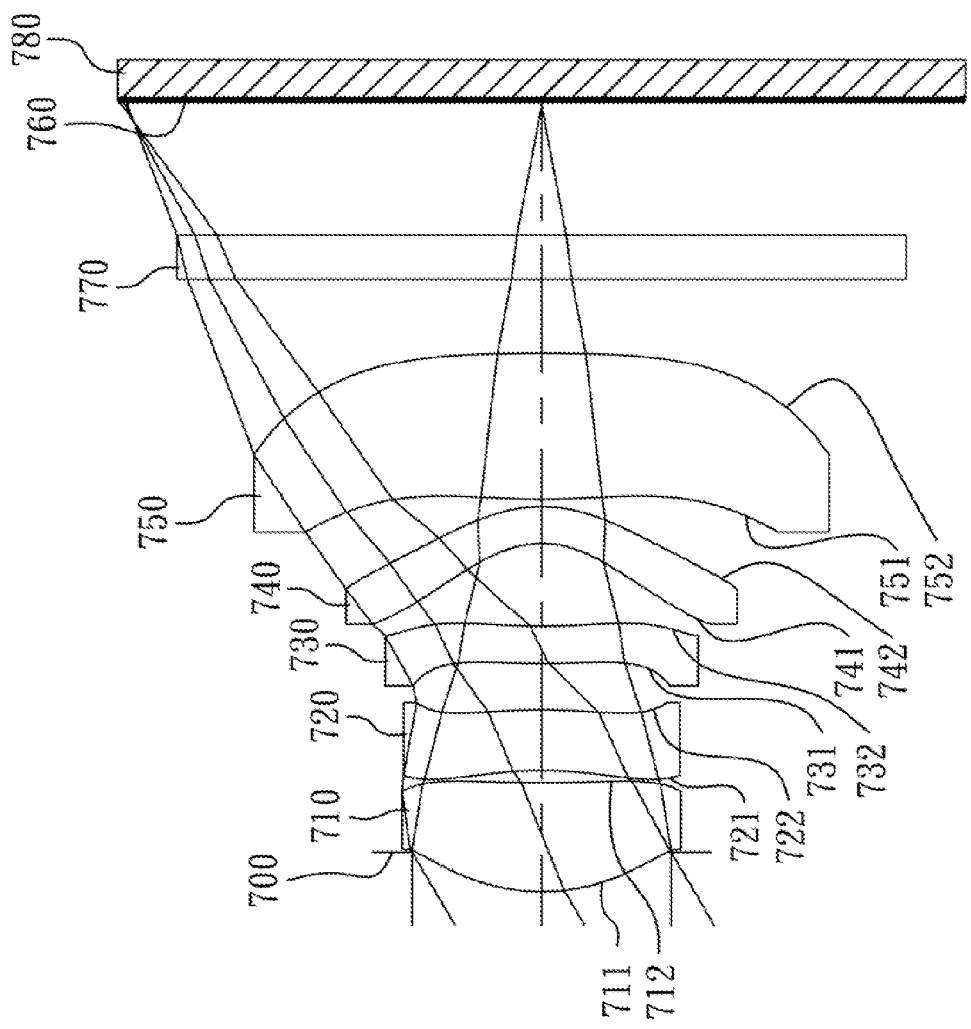
FIG. 13 is a schematic view of an image lens assembly according to the 7th embodiment of the present disclosure.
Figure 14:
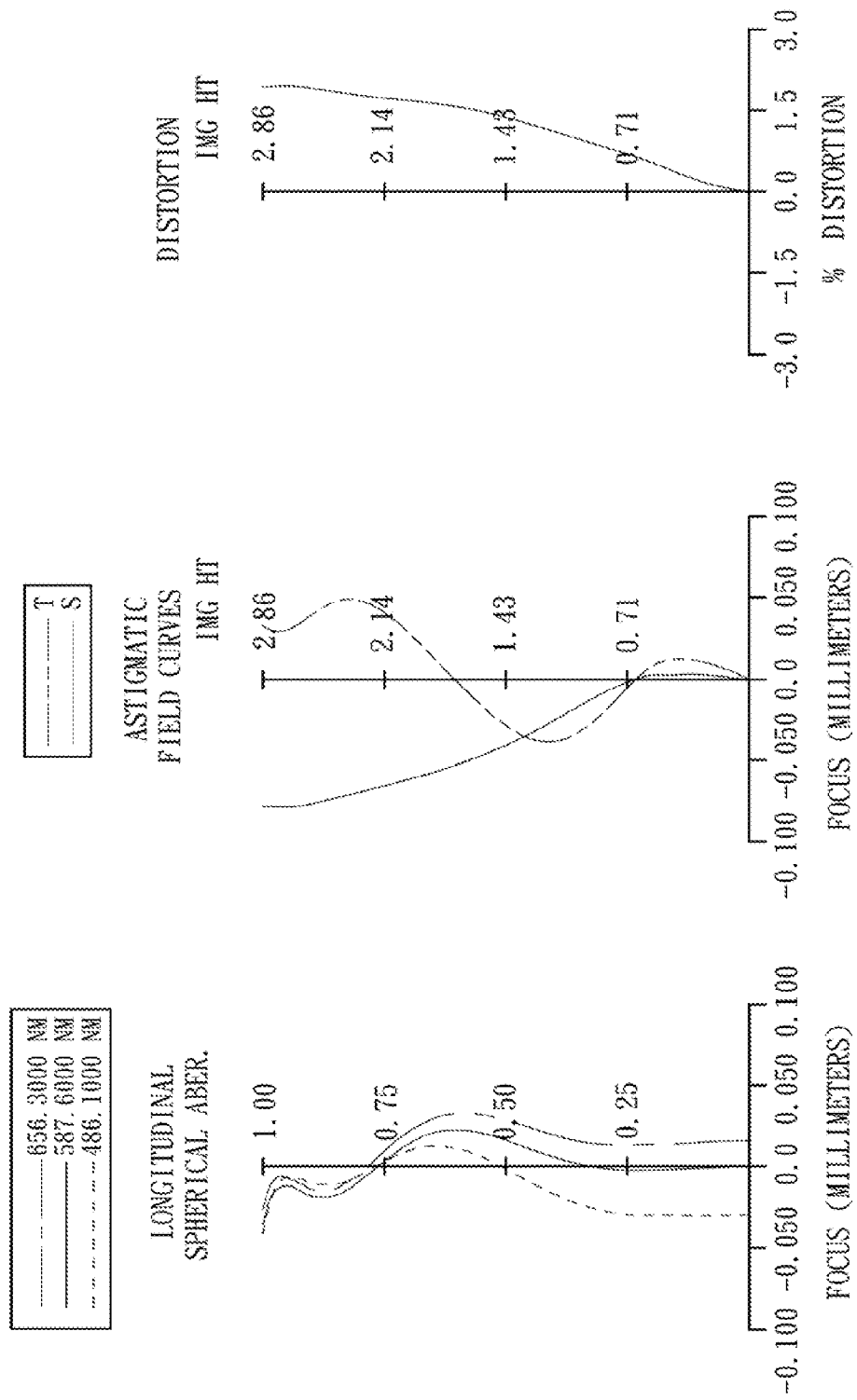
FIG. 14 shows spherical aberration curves, astigmatic field curves and a distortion curve of the image lens assembly according to the 7th embodiment.

FIG. 13 is a schematic view of an image lens assembly according to the 7th embodiment of the present disclosure. FIG. 14 shows spherical aberration curves, astigmatic field curves and a distortion curve of the image lens assembly according to the 7th embodiment. In FIG. 13, the image lens assembly includes, in order from an object side to an image side, an aperture stop 700, the first lens element 710 the second lens element 720, the third lens element 730, the fourth lens element 740, the fifth lens element 750, an IR-cut filter 770, an image plane 760 and an image sensor 780.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a concave object-side surface 721 and a convex image-side surface 722, and is made of plastic material. The object-side surface 721 and the image-side surface 722 of the second lens element 720 are aspheric.

The third lens element 730 with negative refractive power has a convex object-side surface 731 and a concave image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with positive refractive power has a convex object-side surface 751 and a convex image-side surface 752, and is made of plastic material. The object-side surface 751 and the image-side surface 752 of the fifth lens element 750 are aspheric. Furthermore, the fifth lens element 750 has inflection points formed on the object-side surface 751 thereof.

The IR-cut filter 770 is made of glass, and located between the fifth lens element 750 and the image plane 760, and will not affect the focal length of the image lens assembly.

The detailed optical data of the 7th embodiment are shown in Table 13 and the aspheric surface data are shown in Table 14 below.

TABLE 13

7th Embodiment
f = 4.77 mm, Fno = 2.70, HFOV = 30.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.270 | | | | |
| 2 | Lens 1 | 1.351040 (ASP) | 0.741 | Plastic | 1.544 | 55.9 | 2.92 |
| 3 | | 7.290700 (ASP) | 0.084 | | | | |
| 4 | Lens 2 | −2.603420 (ASP) | 0.418 | Plastic | 1.650 | 21.4 | −15.21 |
| 5 | | −3.758100 (ASP) | 0.312 | | | | |
| 6 | Lens 3 | 5.704800 (ASP) | 0.255 | Plastic | 1.640 | 23.3 | −28.67 |
| 7 | | 4.275400 (ASP) | 0.564 | | | | |
| 8 | Lens 4 | −0.630880 (ASP) | 0.250 | Plastic | 1.544 | 55.9 | −4.62 |
| 9 | | −0.960000 (ASP) | 0.050 | | | | |
| 10 | Lens 5 | 4.281800 (ASP) | 1.000 | Plastic | 1.530 | 55.8 | 6.19 |
| 11 | | −12.864200 (ASP) | 0.500 | | | | |
| 12 | IR-cut filter | Plano | 0.300 | Glass | 1.517 | 64.2 | — |
| 13 | | Plano | 0.923 | | | | |
| 14 | Image | Plano | — | | | | |

Note:
Reference wavelength (d-line) is 587.6 nm.

TABLE 14

Aspheric Coefficients

| | Surface # | | | | |
|---|---|---|---|---|---|
| | 2 | 3 | 4 | 5 | 6 |
| k = | 1.24571E−02 | 0.00000E+00 | −1.00000E+00 | −2.30420E+01 | −2.35842E+01 |
| A4 = | −1.74239E−02 | −8.58005E−02 | 1.11158E−01 | 9.87563E−02 | −1.85020E−01 |
| A6 = | −2.61747E−02 | −2.71883E−02 | 7.25415E−02 | 2.14071E−01 | −1.36485E−01 |
| A8 = | 8.88595E−04 | −3.29177E−02 | 2.16986E−02 | −2.35253E−01 | −2.36569E−02 |
| A10 = | −1.68459E−02 | −1.98644E−02 | −6.08346E−02 | 2.51174E−01 | −6.99553E−02 |
| A12 = | −6.90132E−02 | 7.20661E−03 | 3.99127E−02 | 7.39588E−02 | −6.13482E−02 |
| A14 = | | | | | 1.97016E−02 |
| A16 = | | | | | −3.63782E−02 |

| | Surface # | | | | |
|---|---|---|---|---|---|
| | 7 | 8 | 9 | 10 | 11 |
| k = | −6.85996E+01 | −1.30500E+00 | −1.10333E+00 | −1.00000E+02 | 0.00000E+00 |
| A4 = | −8.26415E−02 | 2.84920E−01 | 1.55988E−01 | −7.61870E−02 | −2.87242E−02 |
| A6 = | −8.23350E−02 | −8.48789E−02 | −4.20303E−03 | 1.08369E−02 | −2.09426E−03 |
| A8 = | −6.58623E−03 | −2.09619E−02 | −9.13746E−03 | −1.30472E−03 | −4.64244E−04 |
| A10 = | 1.30651E−02 | 1.45297E−02 | −5.71201E−03 | 2.89170E−04 | 2.44926E−04 |
| A12 = | 3.08508E−02 | 3.59334E−03 | 1.53745E−03 | 3.77172E−06 | −2.58287E−05 |
| A14 = | | | | | −1.80237E−06 |

In the image lens assembly according to the 7th embodiment, the definitions of f, Fno, HFOV, N2, V1, V2, CT4, CT5, R2, R3, R6, R7, f2, f5, SD, TD, BFL, TTL and ImgH are the same as those stated in the 1st embodiment with corresponding values for the 7th embodiment. Moreover, these parameters can be calculated from Table 13 and Table 14 as the following values and satisfy the following relationships:

| f (mm) | 4.77 | |R7/R6| | 0.15 |
| Fno | 2.70 | f/f2 | −0.31 |
| HFOV (deg.) | 30.4 | f/f5 | 0.77 |
| N2 | 1.650 | SD/TD | 0.93 |
| V1 − V2 | 34.5 | BFL/TTL | 0.31 |
| CT4/CT5 | 0.25 | TTL/ImgH | 1.85 |
| |R3/R2| | 0.36 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image lens assembly comprising, in order from an object side to an image side:
   a first lens element with positive refractive power having a convex object-side surface;
   a second lens element with negative refractive power;
   a third lens element with refractive power made of plastic material, and having at least one of an object-side surface and an image-side surface being aspheric;
   a fourth lens element with refractive power made of plastic material, and having a concave object-side surface and a convex image-side surface, wherein at least one of the object-side surface and the image-side surface of the fourth lens element is aspheric; and a fifth lens element with positive refractive power made of plastic material, and having a convex object-side surface and a convex image-side surface, wherein at least one of the object-side surface and the image-side surface of the fifth lens element is aspheric;

wherein a focal length of the image lens assembly is f, a focal length of the second lens element is f2, an axial distance between the object-side surface of the first lens element and an image plane is TTL, and a maximum image height of the image lens assembly is ImgH, the following relationships are satisfied:

$-1.4 < f/f2 < 0$; and $TTL/\text{ImgH} < 2.2$.

2. The image lens assembly of claim 1, wherein the first through fifth lens elements are five independent and non-cemented lens elements.

3. The image lens assembly of claim 2, wherein an axial distance between the image-side surface of the fifth lens element and the image plane is BFL, and the axial distance between the object-side surface of the first lens element and the image plane is TTL, the following relationship is satisfied:

$0 < BFL/TTL < 0.4$.

4. The image lens assembly of claim 3, wherein the fifth lens element has at least one inflection point formed on at least one of the object-side surface and the image-side surface thereof.

5. The image lens assembly of claim 3, further comprising:
a stop located between an object and the second lens element, wherein an axial distance between the stop and the image-side surface of the fifth lens element is SD, and an axial distance between the object-side surface of the first lens element and the image-side surface of the fifth lens element is TD, the following relationship is satisfied:

$0.70 < SD/TD < 1.1$.

6. The image lens assembly of claim 3, wherein a curvature radius of an image-side surface of the first lens element is R2, and a curvature radius of the object-side surface of the second lens element is R3, the following relationship is satisfied:

$|R3/R2| < 0.9$.

7. The image lens assembly of claim 4, wherein an Abbe number of the first lens element is V1, and an Abbe number of the second lens element is V2, the following relationship is satisfied:

$27 < V1 - V2 < 40$.

8. The image lens assembly of claim 4, wherein a central thickness of the fourth lens element is CT4, and a central thickness of the fifth lens element is CT5, the following relationship is satisfied:

$0.05 < CT4/CT5 < 0.6$.

9. The image lens assembly of claim 3, wherein a refractive index of the second lens element is N2, the following relationship is satisfied:

$1.55 < N2 < 1.7$.

10. The image lens assembly of claim 9, wherein a curvature radius of the image-side surface of the third lens element is R6, and a curvature radius of the object-side surface of the fourth lens element is R7, the following relationship is satisfied:

$|R7/R6| < 0.9$.

11. The image lens assembly of claim 9, wherein the focal length of the image lens assembly is f, and a focal length of the fifth lens element is f5, the following relationship is satisfied:

$0 < f/f5 < 1.4$.

12. The image lens assembly of claim 1, wherein the axial distance between the object-side surface of the first lens element and an image plane is TTL, and the maximum image height of the image lens assembly is ImgH, the following relationship is satisfied:

$TTL/\text{ImgH} < 2.0$.

13. An image lens assembly comprising, in order from an object side to an image side:
a first lens element with positive refractive power having a convex object-side surface;
a second lens element with negative refractive power;
a third lens element with refractive power having at least one of an object-side surface and an image-side surface being aspheric;
a fourth lens element with refractive power made of plastic material, and having a concave object-side surface, wherein at least one of the object-side surface and an image-side surface of the fourth lens element is aspheric; and
a fifth lens element with positive refractive power made of plastic material, and having a convex object-side surface and a convex image-side surface, wherein at least one of the object-side surface and the image-side surface is aspheric;

wherein the first through fifth lens elements are five independent and non-cemented lens elements, and the image lens assembly further comprises a stop, wherein a focal length of the image lens assembly is f, a focal length of the second lens element is f2, an axial distance between the stop and the image-side surface of the fifth lens element is SD, an axial distance between the object-side surface of the first lens element and the image-side surface of the fifth lens element is TD, an axial distance between the object-side surface of the first lens element and an image plane is TTL, a maximum image height of the image lens assembly is ImgH, a curvature radius of the image-side surface of the third lens element is R6, and a curvature radius of the object-side surface of the fourth lens element is R7, the following relationships are satisfied:

$-1.4 < f/f2 < 0$;

$0.7 < SD/TD < 1.1$;

$TTL/\text{ImgH} < 2.2$; and $|R7/R6| < 0.9$.

14. The image lens assembly of claim 13, wherein an axial distance between the image-side surface of the fifth lens element and the image plane is BFL, and the axial distance between the object-side surface of the first lens element and the image plane is TTL, the following relationship is satisfied:

$0 < BFL/TTL < 0.4$.

15. The image lens assembly of claim 13, wherein an object-side surface and an image-side surface of the second lens element are aspheric, the third lens element is made of plastic material, the image-side surface of the fourth lens element is convex, and the fifth lens element has at least one inflection point formed on at least one of the object-side surface and the image-side surface thereof.

16. The image lens assembly of claim 13, wherein an Abbe number of the first lens element is V1, and an Abbe number of the second lens element is V2, the following relationship is satisfied:

$27 < V1 - V2 < 40$.

17. The image lens assembly of claim 13, wherein the curvature radius of the image-side surface of the third lens element is R6, and the curvature radius of the object-side surface of the fourth lens element is R7, the following relationship is satisfied:

$|R7/R6| < 0.6$.

18. The image lens assembly of claim 13, wherein a curvature radius of an image-side surface of the first lens element is R2, and a curvature radius of the object-side surface of the second lens element is R3, the following relationship is satisfied:

$|R3/R2| < 0.9$.

19. An image lens assembly comprising, in order from an object side to an image side:
- a first lens element with positive refractive power having a convex object-side surface;
- a second lens element with negative refractive power,
- a third lens element with refractive power having at least one of an object-side surface and an image-side surface being aspheric;
- a fourth lens element with refractive power made of plastic material, and having a concave object-side surface, wherein at least one of the object-side surface and an image-side surface of the fourth lens element is aspheric; and
- a fifth lens element with positive refractive power made of plastic material, and having a convex object-side surface and a convex image-side surface, wherein at least one of the object-side surface and the image-side surface of the fifth lens element is aspheric, and the fifth lens element has at least one inflection point formed on at least one of the object-side surface and the image-side surface thereof;
- wherein an axial distance between the object-side surface of the first lens element and an image plane is TTL, a maximum image height of the image lens assembly is ImgH, a curvature radius of the image-side surface of the third lens element is R6, and a curvature radius of the object-side surface of the fourth lens element is R7, the following relationships are satisfied:

$TTL/ImgH < 2.2$; and $|R7/R6| < 0.9$.

20. The image lens assembly of claim 19, wherein an axial distance between the image-side surface of the fifth lens element and the image plane is BFL, and the axial distance between the object-side surface of the first lens element and the image plane is TTL, the following relationship is satisfied:

$0 < BFL/TTL < 0.4$.

21. The image lens assembly of claim 19, further comprising:
- a stop located between an object and the second lens element, wherein an axial distance between the stop and the image-side surface of the fifth lens element is SD, and an axial distance between the object-side surface of the first lens element and the image-side surface of the fifth lens element is TD, the following relationship is satisfied:

$0.70 < SD/TD < 1.1$.

22. The image lens assembly of claim 19, wherein a refractive index of the second lens element is N2, and the following relationship is satisfied:

$1.55 < N2 < 1.7$.

23. The image lens assembly of claim 19, wherein a focal length of the image lens assembly is f, a focal length of the second lens element is f2, and a focal length of the fifth lens element is f5, the following relationships are satisfied:

$-1.4 < f/f2 < 0$; and $0 < f/f5 < 1.4$.

24. The image lens assembly of claim 19, wherein the curvature radius of the image-side surface of the third lens element is R6, and the curvature radius of the object-side surface of the fourth lens element is R7, the following relationship is satisfied:

$|R7/R6| < 0.6$.

* * * * *